United States Patent
Jacoby et al.

(10) Patent No.: US 8,943,538 B2
(45) Date of Patent: Jan. 27, 2015

(54) SYSTEM AND METHOD FOR TAGGING CONTENT AND DELIVERING THE TAG TO BUDDIES OF A GIVEN USER

(75) Inventors: Ronald Jacoby, Saratoga, CA (US); Brenda O'Kane, Burlingame, CA (US)

(73) Assignee: Yahoo! Inc., Sunnyvale, CA (US)

(*) Notice: Subject to any disclaimer, the term of this patent is extended or adjusted under 35 U.S.C. 154(b) by 853 days.

(21) Appl. No.: 11/498,459

(22) Filed: Aug. 2, 2006

(65) Prior Publication Data

US 2006/0271961 A1 Nov. 30, 2006

Related U.S. Application Data

(63) Continuation of application No. 11/327,198, filed on Jan. 5, 2006, now Pat. No. 8,230,456, which is a continuation-in-part of application No. 11/261,436, filed on Oct. 27, 2005, now Pat. No. 8,381,240.

(60) Provisional application No. 60/641,787, filed on Jan. 5, 2005, provisional application No. 60/641,717, filed on Jan. 5, 2005.

(51) Int. Cl.
| | |
|---|---|
| H04N 7/10 | (2006.01) |
| H04N 7/025 | (2006.01) |
| G06F 3/00 | (2006.01) |
| G06F 13/00 | (2006.01) |
| H04N 5/445 | (2011.01) |
| H04N 21/4227 | (2011.01) |
| H04N 7/173 | (2011.01) |
| H04N 21/478 | (2011.01) |
| H04N 21/81 | (2011.01) |
| H04N 21/4788 | (2011.01) |
| H04N 21/258 | (2011.01) |
| H04L 29/08 | (2006.01) |

(52) U.S. Cl.
CPC ....... *H04N 7/17318* (2013.01); *H04N 21/4227* (2013.01); *H04N 21/4781* (2013.01); *H04N 21/812* (2013.01); *H04N 21/4788* (2013.01); *H04L 67/306* (2013.01); *H04N 21/25891* (2013.01)
USPC .............................................. 725/46; 725/34

(58) Field of Classification Search
CPC .......... H04N 21/4668; H04N 21/4788; H04N 21/858; H04N 21/4227
USPC ...................................... 725/34, 46; 3/34, 46
See application file for complete search history.

(56) References Cited

U.S. PATENT DOCUMENTS

| | | | |
|---|---|---|---|
| 7,877,776 B2 * | 1/2011 | Krikorian et al. ............... | 725/95 |
| 2002/0112239 A1 * | 8/2002 | Goldman ........................ | 725/46 |
| 2003/0093806 A1 * | 5/2003 | Dureau et al. ................ | 725/107 |
| 2004/0073944 A1 * | 4/2004 | Booth ........................... | 725/131 |
| 2004/0231003 A1 * | 11/2004 | Cooper et al. ................ | 725/135 |
| 2005/0132401 A1 * | 6/2005 | Boccon-Gibod et al. ....... | 725/34 |
| 2006/0123455 A1 * | 6/2006 | Pai et al. ....................... | 725/133 |
| 2006/0195532 A1 * | 8/2006 | Zlateff et al. ................. | 709/206 |
| 2006/0257123 A1 * | 11/2006 | Horozov et al. .............. | 386/112 |
| 2007/0043829 A1 * | 2/2007 | Dua .............................. | 709/219 |
| 2007/0169148 A1 * | 7/2007 | Oddo et al. ..................... | 725/46 |
| 2008/0092168 A1 * | 4/2008 | Logan et al. .................... | 725/44 |
| 2009/0260037 A1 * | 10/2009 | Knudson ........................ | 725/46 |

* cited by examiner

*Primary Examiner* — Ricky Chin
(74) *Attorney, Agent, or Firm* — James J. DeCarlo; Greenberg Traurig, LLP

(57) ABSTRACT

A method comprises retrieving a profile of a given user, the given user having a given-user device; delivering a content item to the given-user device; receiving one or more user-specified tags associated with the content item; identifying one or more buddies of the user as indicated in the profile; and delivering the one or more tags to the one or more buddies.

20 Claims, 20 Drawing Sheets

SYSTEM AND METHOD FOR TAGGING CONTENT AND DELIVERING THE TAG TO BUDDIES OF A GIVEN USER

PRIORITY CLAIM AND RELATED APPLICATIONS

This application is a continuation of and incorporates by reference U.S. application Ser. No. 11/327,198, filed on Jan. 5, 2006 now U.S. Pat. No. 8,230,456, entitled "FRAMEWORK FOR DELIVERING A PLURALITY OF CONTENT AND PROVIDING FOR INTERACTION WITH THE SAME IN A TELEVISION ENVIRONMENT", which is a continuation-in-part of U.S. application Ser. No. 11/261,436, filed Oct. 27, 2005 now U.S. Pat. No. 8,381,240, entitled "FRAMEWORK FOR PROVIDING DIGITAL HOME SERVICES," and which claims priority to U.S. Provisional Application No. 60/641,787, filed on Jan. 5, 2005, entitled, "SYSTEM AND METHOD FOR EXTENDING ONLINE SERVICES TO OTHER PLATFORMS," and U.S. Provisional Application No. 60/641,717, filed on Jan. 5, 2005, entitled "SYSTEM AND METHOD FOR ACCESSING PERSONALIZED MULTIMEDIA CONTENT", all of which are incorporated by reference in their entirety.

This application incorporates the following commonly owned patent application in their entirety:
application Ser. No. 11/327,188, entitled "INFORMATIONAL ALERT MESSAGING FOR DIGITAL HOME SERVICES", filed Jan. 5, 2006;
application Ser. No. 11/327,665, entitled "FRAMEWORK FOR PROVIDING ANCILLARY CONTENT IN A TELEVISION
application Ser. No. 10/752,819, entitled "SYSTEM AND METHOD FOR ACCESSING SPECIALIZED CONTENT ASSOCIATED WITH BROADCAST CONTENT," filed Jan. 6, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Embodiments of the present invention relate to methods and systems for facilitating the delivery of content items and interaction with content items in a television environment. More specifically, embodiments of the present invention relate to methods and systems that facilitate the simultaneous delivery of a plurality of items of content, including content associated with one or more users in a given social network, as well as the interaction among one or more users in a television viewing environment.

Systems for distributing TV content are generally well known to those of skill in the art. Over the past several decades, the number of systems designed for the distribution and consumption of TV content has proliferated, while the number of available channels of TV content has skyrocketed. For example, viewers are now able to consume TV content over cable, over the air broadcast, satellite, fiber optic, as well as other point (and multipoint) to multipoint distribution systems, each potentially offering several hundred channels of scheduled and on-demand TV content. Consumers have had difficulty in effectively utilizing the pool of available TV content due to a lack of useful tools for analyzing programming to determine the TV content that is potentially the most enjoyable or relevant to the user. Furthermore, the viewing of TV content has heretofore been an essentially solitary experience outside of viewing TV content with another individual located at the same location.

In order to overcome these shortcomings and other problems associated with existing apparatuses and techniques for viewing TV content, embodiments of the present invention provide systems and methods for both a shared viewing experience of TV content, as well as providing messenger and messenger related services and content within the framework of viewing TV content. Moreover, embodiments of the present invention provide for interaction among a plurality of users for a community viewing environment.

SUMMARY OF THE INVENTION

According to an embodiment, the present invention provides a method comprising retrieving a profile of a given user, the given user having a given-user device; delivering a content item to the given-user device; receiving one or more user-specified tags associated with the content item; identifying one or more buddies of the user as indicated in the profile; and delivering the one or more tags to the one or more buddies.

The content item may include at least one of television content, audio content, video content, web pages, and gaming applications. The content item may include content recommended based on the profile. The content item may include content selected by the given user. The identifying the one or more buddies may include identifying one or more instant messaging applications to which the user has subscribed; identifying one or more other users in the one or more instant messaging applications; and identifying at least one of the one or more of the other users as the one or more buddies. The identifying the one or more buddies may include identifying characteristics of the given user from the profile; examining characteristics of other user profiles to identify other users with similar characteristics; identifying one or more other users as the one or more buddies. The one or more user-specified tags may include user-specified delimiters of at least one portion of the content item. The delivering the one or more tags to the one or more buddies may include delivering the delimiters to the one or more buddies. The method may further comprise delivering the at least one portion of the content item to the one or more buddies.

According to another embodiment, the present invention provides a system comprising a content store for storing content items; a given-user device of a given user; an other-user device of another user; and a content distribution server coupled to the content store, the given user device and the other-user device and operative to retrieve a profile of a given user, deliver a content item to the given-user device, receive one or more user-specified tags associated with the content item, identify one or more buddies of the user as indicated in the profile, and deliver the one or more tags to the one or more buddies.

The content item may include at least one of television content, audio content, video content, web pages, and gaming applications. The content item may include content recommended based on the profile. The content item may include content selected by the given user. The content distribution server may be operative to identify one or more instant messaging applications to which the user has subscribed, identify one or more other users in the one or more instant messaging applications, and identify at least one of the one or more of the other users as the one or more buddies. The content distribution server may be operative to identify characteristics of the given user from the profile, examine characteristics of other user profiles to identify other users with similar characteristics, and identify one or more other users as the one or more buddies. The one or more user-specified tags may include user-specified delimiters of at least one portion of the content item. The content distribution server may be operative to deliver the delimiters to the one or more buddies. The content distribution server may be operative to deliver the at least one portion of the content item to the one or more buddies.

According to yet another embodiment, the present invention provides a system comprising retrieving means for retrieving a profile of a given user, the given user having a given-user device; first delivering means for delivering a content item to the given-user device; receiving means for receiving one or more user-specified tags associated with the content item; identifying means for identifying one or more buddies of the user as indicated in the profile; and second delivering means for delivering the one or more tags to the one or more buddies.

The retrieving means may include a profile component. The identifying means may include a messaging component. The first delivering means, receiving means, and second delivering means each may include a portion of a TV application component.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of embodiments of the invention, reference is made to the accompanying drawings that form a part hereof and in which is shown by way of illustration a number of specific embodiments in which the invention may be practiced. It is to be understood that other embodiments may be utilized and structural changes may be made without departing from the scope of the present invention.

Figure 1:
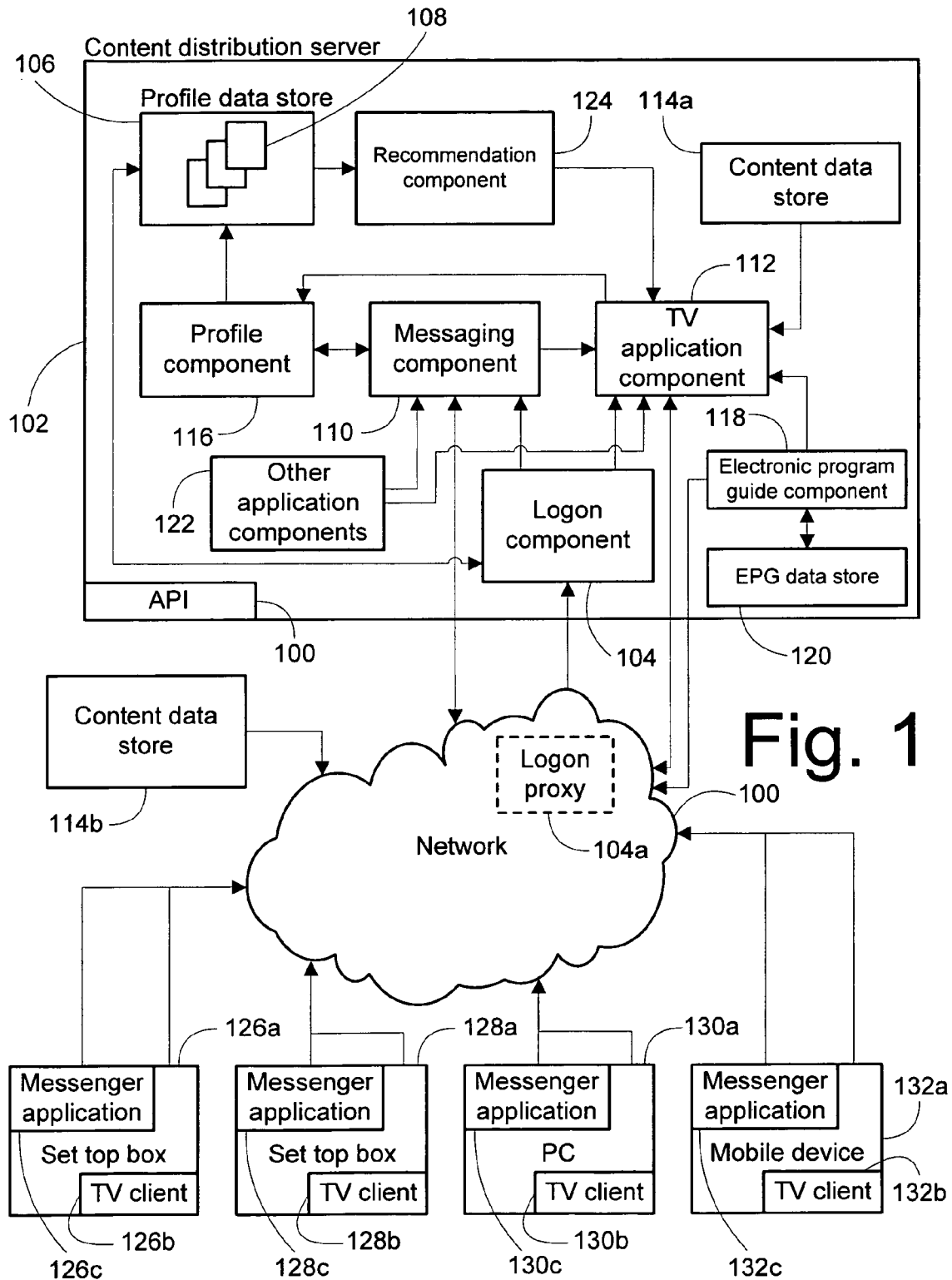
FIG. 1 is a block diagram illustrating a system for providing access to messenger services and content in conjunction with TV content and ancillary TV content according to one embodiment of the present invention.

FIG. 1 presents a block diagram illustrating one embodiment of a system for providing access to messaging services and content in conjunction with television and TV related content. According to the embodiment of FIG. 1, a content distribution server 102 comprises one or more software and hardware components to facilitate the delivery of television and TV related content in conjunction with messaging and messaging related content and services. Hardware and software components include, but are not limited to, a logon component 104, a messaging component 110, a TV application component 112, a profile component 116, an electronic program guide component 118, a recommendation component 124 and other applications 122. The content distribution server 102 also comprises one or more data stores for persistent storage of information used in providing both TV and messaging content and services including, but not limited to, a profile data store 106, content data stores 114a and 114b, and an EPG data store 120.

The content distribution server 102 is communicatively coupled with a network 100, which may include a connection to one or more local and/or wide area networks, such as the Internet. Using the network 100, the content distribution server 102 is capable of accessing local 114a and remote 114b television content, as well as providing television and messaging services, including combinations thereof, to clients 126a, 128a, 130a and 132a. The content distribution server 102 is operative to provide TV and messaging content and services to any client device capable of running TV client software 126b, 128b, 130b and 132b, as well as a messaging client 126c, 128c, 130c and 132c. For example client devices may include set top terminals 126a and 128a that use a television as a display device, computer hardware such as a personal computer 130a and mobile devices 132a, such as cellular handsets and personal digital assistants ("PDA"). Other types of electronic communications equipment is contemplated as falling with in the scope of the invention including, but not limited to, digital media adapters, DVD players, connected TVs and other networked consumer electronic devices.

When a given client 126a, 128a, 130a and 132a initially accesses the content and services that the content distribution server 102 provides, the server authenticates the given user and/or client device. The content distribution server 102 provides a logon component that allows for the authentication of clients 126a, 128a, 130a and 132a and/or users of a given client device. A client device 126a, 128a, 130a and 132a initializes its TV client application 126b, 128b, 130b and 132b and messenger client application 126c, 128c, 130c and 132c, which initiates the generation and transmission over the network 100 of a logon request to the logon component 104. According to one embodiment of the invention, the logon request comprises information identifying the user of the client device in addition to information regarding the client device itself, e.g., a MAC address, IP address, phone number or other uniquely identifying descriptor. By providing information regarding the user, the content distribution server 102 may provide a personalized experience to the user regardless of the specific client device 126a, 128a, 130a and 132a with which the user connects to the content distribution center 102.

The logon component 104 receives the logon request from a given client 126a, 128a, 130a and 132a and attempts to authenticate the user and/or device. The logon component 104 may access a profile 108 for the given user that a profile data store 106 maintains. Accordingly, the logon component 104 uses information identifying the user in an attempt to authenticate the identity of the user, e.g., against information contained in the user's profile 108. The identifying information may comprise a username and password whereby the logon component 104 conducts a comparison to ensure that the received password is identical to a stored password. Alternatively, or in conjunction, the logon component 104 may conduct an exchange of public keys with the client 126a, 128a, 130a and 132a whereby each device (client and logon component) encodes outgoing data with the received public key and decodes received data with its private key. The logon component 104 may also receive information regarding the client device 126a, 128a, 130a and 132a, e.g., a MAC address or other uniquely identifying indicia, to authenticate the client device or otherwise validate that the client 126a, 128a, 130a and 132a may connect to the content distribution server 102.

The content distribution server 102 may also implement a logon proxy 104a to provide scalability and the flexibility to handle large numbers of clients 126a, 128a, 130a and 132a attempting to connect to the logon component 104. Multiple client devices 126a, 128a, 130a and 132a initiate communication over the network 100 with a given one of one or more logon proxies 104a. Each logon proxy 104a initiates communication with the logon component 104, thereby allowing the logon component 104 to service a large number of client requests without the necessity of maintaining and managing a connection with each requesting client 126a, 128a, 130a and 132a.

Where the logon component 104 is unable to successfully authenticate the user or client 126a, 128a, 130a and 132a, the logon component 104 prevents the client 126a, 128a, 130a and 132a from accessing functionality that the content distribution server 102 offers. Alternatively, the logon component 104 may solely provide access to the TV application component 112, electronic program guide component 118 and EPG data store 120, thereby allowing the user to view TV content and scheduling data on the client 126a, 128a, 130a and 132a. A user whom the logon component is unable to authenticate is therefore presented with a traditional digital TV content viewing experience with content from one or more content sources 114a and 114b, as well as program guide data for his or her locality.

Where the logon component 104 successfully authenticates the user and/or client device, the logon component may record an indication of the successful authentication in the user's profile 108 in the profile data store 106. The logon component 104 provides an indication to the messaging server 110 and the TV application component 112 that the user and/or client 126a, 128a, 130a and 132a has been successfully authenticated and may be provided with access to the content distribution server and its constituent components identified above. Upon successful authentication, the messaging server 110 passes the identity of the user to the profile component 116, which retrieves the user's profile 108 from the profile data 106 store for transmission to the messaging component 110. The messaging component 110 may also provide the TV application 112 with a copy of the user's profile 108, or the TV application component 112 may obtain a copy of the user's profile 108 directly from the profile component 116.

The content distribution server 102 maintains a user profile 108 for each user in a profile data store 106, which is managed by a profile component 116. Alternatively, or in conjunction with the foregoing, a user profile may be stored on a remote server (not pictured), coupled to the content distribution server 102. A user profile maintained on a remote server may be utilized by a plurality of servers coupled to the remote server, including the content distribution server 102, to identify a given user and the user's activities. As indicated above, a user profile 108 maintains authentication information for the user, such as a username and password. The user profile may also be used by the messaging component 110 and TV application component 112 for the recordation of user interaction with the components, 110 and 112, respectively. Accordingly, the user profile may maintain an historical record of the interactions of the user with the content distribution server 102.

Those of skill in the art should understand, however, that a subset of this historical interaction may be written to the user profile 108. For example, when the user is using the TV application component 112 to view TV content, the TV application component 112 sends a message to the profile component 116 to write indicia to the user's profile 108 in response to the receipt of a command, e.g., a change channel command. Similarly, when the messaging component 110 provides messaging content and related services to the user, the messaging component 110 sends a message to the profile component 116 instructing it to write indicia to the user's profile 108 in response to the receipt of a command, e.g., sending a message to another user or stepping into an on-line game.

The profile 108 also maintains a user's "context". According to one embodiment, a user's context may be a notion of an action that a given user is performing at a given point in time, which may also include the location from which the user is performing that action. Put another way, a user's context may be what the user is doing at a given point in time, e.g., watching a given TV channel, playing an on-line game, listening to music, conducting an on-line transaction, etc. The context may also indicate from where or what type of device the client is connecting to the content distribution server 102, e.g., a set top box 126a and 128a, a personal computer 130a, a mobile device 132a, etc. By providing the user's context to the messaging component 110 and the TV application component 112, each component, 110 and 112, is capable of identifying and retrieving the proper content to provide the user with messaging content and related services unified with TV content and related services as is explained in greater detail herein. The profile component 116 receives updates to the given user's context form the messaging component 110 and TV application component 112 that the profile component 116 writes to the user profile 108 for the given user. The profile 108 for a given user therefore maintains an historical record of the user's context over a period of time.

The profile may also maintain information regarding other users of the system to whom a given user is related. For example, the given user may use a messaging client 126c, 128c, 130c and 132c on a client device 126a, 128a, 130a and 130a to identify one or more buddies, the identities of which are written to the given user's profile 108. By traversing groups of related users, the profile component 116 is operative to identify social networks of users. Communities of users may also exist whereby an indication of the membership in a community is written to the given user's profile 108. Similarly, the profile component 116 may identify subsets of a given user's buddies from the given user's total set of buddies. According to one embodiment, the profile component 116 calculates a social network for a given user that comprises all users with an N-degree relationship to the given user. For example, User A maintains a direct relationship with User B, and User B maintains a direct relationship to user C. User A and User C are related by two degrees, whereas each is related to User B by one degree.

The TV application component 112 identifies the user's context and retrieves the proper TV content for transmission over the network 100 to the client device 126a, 128a, 130a and 132a with which the user is interacting. Furthermore, the TV application component 112 may retrieve ancillary TV content including, but not limited to, audio, video, text, images and combinations thereof. According to one embodiment of the invention, the TV application component 112 retrieves TV content and ancillary TV content from a local content data store 114a, which may aggregate TV content and ancillary TV content from a variety of disparate sources. Alternatively, or in conjunction, the TV application component 112 receives TV content and ancillary TV content from a local content data store 114a, as well as over the network 100 from a remote content data store 114b, where required content resides remotely from the server 102. Similarly, the TV application component 112 may collect TV content from a plurality of TV content distribution systems (not pictured) for storage in the local and remote content data stores, 114a and 114b, respectively. The TV application component 112 may selectively transmit TV content to users on the basis of a schedule for the transmission of TV content promulgated by the TV content distribution system for the region in which a given user is located.

The messaging component 110 is also provided with the user's context, thereby allowing the messaging component 110 to know what actions the user is performing, e.g., watching TV content, viewing ancillary TV content, playing an on-line game, listening to music, etc. Because the messaging component 110 is aware of the user's identity, the messaging component 110 may identify other users in the given user's social network, also referred to as the user's "buddies". With knowledge of the given user's identity and other users in the given user's social network, the messaging component 110 may instruct the TV application 112 to propagate the given user's context to other users in the given user's social network. Propagating the user's context may include generating an image representing the user's context, which may further include other data describing the user's context (e.g., text, audio, video, combinations thereof, etc.). Alternatively, information regarding the user's context may be used to lookup and retrieve additional related information from a content data store 114a and 114b. The TV application server 112 presents other users in the given user's social network with the given user's context, such as through the presentation of an icon. The TV application server 112 may provide a given user with the context of other users in the given user's social network, and vice versa.

The following example may be illustrative and is not intended to be limiting. Assume that the user is watching the TV program "The Apprentice" on channel three. According to one embodiment, the messaging component 110 identifies the user's buddies and instructs the TV application component 112 to propagate the user's context to his or her buddies. The TV application component 112 generates a thumbnail image representing the program "The Apprentice", which the TV application component 112 propagates to the given user's buddies. The thumbnail is presented on a client device for a given buddy with information describing the program, e.g., the title and the fact that the user is watching the program on channel three. The TV application server 112 may modify information regarding the given user's content, e.g., scaling down the thumbnail image, on the basis of a given destination client device 126a, 128a, 130a and 132a.

The messenger component 110 and TV application component 112 allow for a number of advanced features not available in content distribution systems known to those of skill in the art. Because the messaging component is aware of a given user's context and may receive input from a given client device 126a, 128a, 130a and 132a, users of the content distribution server 102 may interact with one another. The messaging component 110 provides a given user's context to the TV application component 112, which propagates the context to other users in the given user's social network and vice versa. The given user may select an indication of the context of other users in the given user's social network to initiate an action. Initiating an action may include starting an instant message conversation with the selected user, switching context to the context of the selected user, etc. Selections are passed to the messaging component 110, which performs the requested action and provides content for the TV application component to consume and propagate as is appropriate to other users. One illustrative use of this functionality is shared viewing of content between a plurality of users, shared remote control functionality between a plurality of users, combinations thereof, shared remote and shared viewing with instant messaging between a plurality of users, etc.

The messaging component 110 also provides access to other application components 122. Alternatively, other application components 122 may communicate directly with the TV application component 112 to provide content for distribution to one or more client devices 126a, 128a, 130a and 132a in communication with the content distribution server 102 over the network 100. One exemplary other application component 122 is an on-line poker playing application. The other application 122 handles the main program logic for on-line poker playing game. Each user's context (which may comprise location information (e.g., playing on-line poker), the identities of other players in the game, what the given user's action is (hit, hold, double down), etc.) is provided to the messaging component 110, which passes information regarding a given user's context to the TV application component for propagation to other players in the game.

Propagation of information regarding a given user's context may also be propagated to other users in a given user's social network who are not necessarily playing the on-line poker game. Those of skill in the art should recognize that other application components falling within the scope of the present invention are not limited to on-line poker playing components, and may include other applications that the messaging component 110 can interface with, including, but not limited to, music engines whereby the messaging component 110 may instruct the TV application component 112 as to the current song to which a user is listening, search applications whereby the messaging component 110 may instruct the TV application component 112 as to the keywords over which a user is searching and the related result set, etc. These are examples of a given user's context that the TV application component 112, in conjunction with the messaging component 110, may propagate to users of the content distribution server 102 to provide for a shared content consumption experience.

As indicated above, the TV application component 112 may propagate a given user's context to other users in the given user's social network, which may include channel information regarding a TV program that the given user is viewing. An issue arises, however, when individual users are accessing TV content in different time zones and locations with different channel assignments. The content distribution server 102 includes an electronic program guide component 118 communicatively coupled to the network 100 and operative to receive electronic program guide information, e.g., the program schedule for a given location and time zone. The electronic program guide component 118 queries program guide servers (not pictured) that are in communication over the network 100, such as the program guide servers operated by Tribune Media Services. The electronic program guide component 118 stores the one or more electronic program guides in an EPG data store 120. According to one embodiment of the invention, the EPG data store 120 is a relational database, but may be substituted by a tab delimited data store, a comma delimited data store, an object oriented database, a hybrid object-relational database, or other data stores known to those of skill in the art. Systems and methods for generating electronic program guides include U.S. Pat. No. 6,813,774, entitled "PROGRAM GUIDE DISPLAY APPARATUS AND PROGRAM GUIDE DISPLAY METHOD", U.S. Pat. No. 6,763,522, entitled "SYSTEM AND METHOD FOR A DIGITAL TELEVISION ELECTRONIC PROGRAM GUIDE" and U.S. Pat. No. 6,611,958, entitled "ELECTRONIC PROGRAM GUIDE FEATURE FOR AV SYSTEM", the disclosures of which are hereby incorporated by reference in their entirety. Furthermore, those of skill in the art recognize a number of electronic program guides are commercially available, including those available from Pioneer, Scientific Atlanta, Motorola, Gemstar/TVGuide ("GTVG"), Charter Communications, etc.

When the TV application component 112 propagates a given user's context to other users in the given user's social network, the TV application component 112 may query the electronic program guide component 118 to determine a local context for a user in the social network that corresponds to the user's context. For example, where the user is viewing a program on the ABC network, that same program is not necessarily being transmitted on the same channel in all locations and time zones, if the program is being transmitted at all. Accordingly, for each user in a given user's social network to which the TV application component 112 is to transmit a given user's context, the electronic program guide component 118 retrieves the electronic program guide from the EPG data store 120 for a user in the social network.

The electronic program guide component 118 executes a search in an attempt to locate the program that the given user is viewing in the electronic program guide. If successful, the electronic program guide component 118 instructs the TV application component 112 as to the channel on which the user in the social network may find the program that the given user is viewing being transmitted; the TV application component 112 may propagate this information as part of the given user's context. Where the electronic program guide component 118 cannot locate the given user's context in the electronic program guide, e.g., the program that the given user is viewing is not presently being transmitted in the time zone in which the user in the social network is located, the electronic program guide component 118 may identify alternate times at which the program is being transmitted, which the TV application component 112 may also propagate as part of the given user's context. The TV application component 112 transmits this information to the user in the social network. Where the client device 126a, 128a, 130a and 132a comprises digital video recording functionality ("DVR"), the TV application component 118 may provide the user in the social network with an opportunity to schedule recording of the program. Recording may also comprise the recording of content that is not selectable by a given user through interaction with an EPG, e.g., Internet based content. It should be noted that selection of a program or other content for recording may be recorded in the user's profile as a context or context change.

According to one embodiment of the invention, the content distribution server 102 uses a unique identifier to identify each program that it is transmitting to clients 126a, 128a, 130a and 132a, e.g., stored in the EPG data store 120. According to another embodiment of the invention, the content distribution server 102 utilizes unique program identifiers ("PID") provided by an EPG data stream to identify each program that it is transmitting to clients 126a, 128a, 130a and 132a. The electronic program guide component 118 searches the EPG data store 120 to locate the program that the given user is viewing and determines the program's unique identifier, which the TV application component 112 may propagate as part of the given user's context. A client device 126a, 128a, 130a and 132a that a user in the given user's social network is operating receives the given user's context and attempts to identify the program that the given user is viewing in a local electronic program guide, which may be stored on the client 126a, 128a, 130a and 132a or retrieved from a network source.

If successful, client side software, e.g., a TV client 126b, 128b, 130b and 132b, instructs the user in the social network as to the channel on which he or she may find that program that the given user is viewing, which may include allowing the user in the social network to tune to channel on which the TV application component 118 is transmitting the program. Where the identifier for the program cannot be located in the local electronic program guide, client side software may identify alternate times at which the program is being transmitted. Where the client device 126a, 128a, 130a and 132a comprises digital video recording functionality ("DVR"), the client 126a, 128a, 130a and 132a may provide the user in the social network with an opportunity to schedule recording of the program. Recording functionality of the DVR may also include the recording of content that does not appear in an EPG, e.g., Internet based content.

As discussed above, interaction with the messaging component 110 and TV application component 112 may be recorded by the profile component 116, which maintains a profile 108 for each user in a profile data store 106. In other words, the profile 108 contains a history of the user's context changes as a function of time, allowing decisions to be made regarding the given user's preferences on this basis. For example, where the user's context is identified as viewing science fiction programs for long periods of time and news programs for short periods of time, a decision may be made that the user prefers science fiction programs. This may also account for sub-genres, e.g., science fiction/action, science fiction/horror, etc. Each profile 108 may also comprise context information as a function of time for other users in a given user's social network, as well as other users that utilize the content distribution server 102.

A recommendation component 124 may utilize user profiles in the profile data store to supply recommended programming to the user, which may also include providing recommendations for using other applications, such as in response to on-line events, users with whom a given user might want to be a buddy, ancillary TV content, etc. According to embodiments of the invention, the recommendation component 124 may utilize a user profile in determining recommended content to a user. Alternatively, or in conjunction with the foregoing, the recommendation component 124 may also utilize the user profiles of a given user's buddies, e.g., the profiles of those users that are in the given user's social network. The recommendation component 124 may also compute a vector for the given user's profile and include those users with similar profile vectors in its calculation of recommended content. Also, the recommendation component 124 may utilize profiles for user communities, which contain aggregate context information for a community of users, when determining recommended content. Similarly, the recommendation component 124 may utilize a personalization service, such as My Yahoo!, which allows users to create and edit their own profiles for indicating media preferences (e.g., favorite channels or TV programs), which are stored on Yahoo! servers (which may be profile data stores 106) and made available to the recommendation component 124.

The recommendation component 124 allows the content distribution server 102 to harness the viewing experience, habits and preferences of the users who are interacting with the content distribution server 102. As indicated above, the recommendation component 124 may provide recommendations beyond TV content, extending to all services that the content distribution server offers. For example, a user may interact with the messaging component 110 to access other application components 122 through the TV application component 112. One exemplary other application component 122 is an on-line poker game in which users play against each other on line. Where the user profile indicates that the user spends substantial time in the context of an on-line poker application 122, the recommendation component may alert the user when an upcoming on-line poker tournament is approaching.

The system of the present invention illustrated at FIG. 1 provides for a shared content consumption experience for users of the content distribution server 102. A given user may be informed of the context of other users of the system, including users in the given user's social network. According to one embodiment, icons and accompanying textual data are propagated by the TV application component and presented to the given user on a client device 126a, 128a, 130a and 132a, indicating the context of other users of the server 102. The presentation of the context of other users in conjunction with the presentation of TV content allows for a shared viewing experience whereby a given user may know the context of other users and may change his or her context to that of another user. For example, where the context of a user in a given user's social network indicates the user in the social network is watching a program that is enjoyable to the given user, the given user may change his or her context to match that of the user in the social network (e.g., tuning to receive transmission of the same TV content that the user in the social network is consuming). Using the architecture described herein, a number of applications become available in the context of the TV consumption process, including, but not limited to personalization, community viewing, shared presence and context, messaging, access to ratings and recommendations (including community reviews), alerts, etc.

The content service provider 102 provides access to it functions and application components through the use of one or more application program interfaces ("API") 100. An API 100 is an interface, or set of calling conventions, by which a given application component accesses other application components and the services that the application components offer. By using the API 100, a given application component advertises information regarding the functions and/or services that the given application component may provide to other components, which may also include the technique by which the functions or services are accessed. This allows the application components comprising the system to access supporting system and network services. For example, the API 100 allows client side applications to issue function calls for the performance of actions and accessing of services, such as tuning a channel, accessing an on-line game, listening to music, allowing the messenger component to interface with the TV application component or a messaging client to access EPG data, etc., as described herein. Although FIG. 1 illustrates the API 100 as a separate system component, those of skill in the art recognize that each application component may provide an individual API 100 identifying the specific functions and services a given application component provides. Furthermore, application components, e.g., a messaging client 126c, 128c, 130c, 132c, resident on client devices 126a, 128a, 130a, 132a may provide one or more APIs 100 advertising the functions and service the given application component provides.

Figure 2:
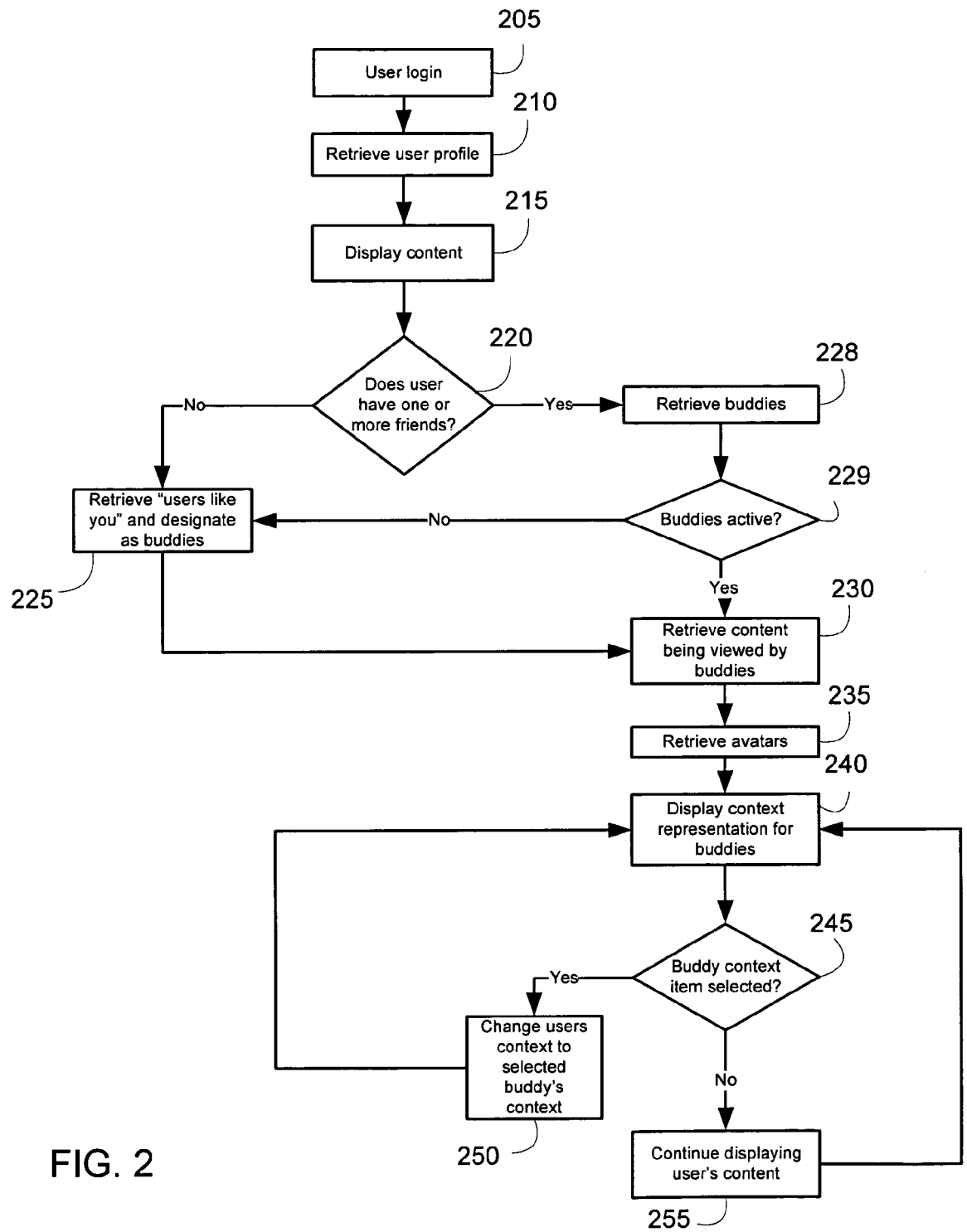
FIG. 2 is a flow diagram presenting a method for initializing a given user's session and retrieving the context of a given user's one or more buddies according to one embodiment of the present invention.

One embodiment of a method for selecting content based upon the one or more users in a given user's social network ("buddies") is illustrated in FIG. 2. According to the embodiment illustrated in FIG. 2, a user of a client device may initialize and connect to a content distribution system, step 205, which may include a logon component. Initialization may comprise a client device powering up and initializing a communications stack, such as a TPC/IP stack, and opening a connection to the logon component over a network, e.g., the Internet. The logon component attempts to verify a user's credentials using information maintained in the user's profile that may be retrieved by a profile component, step 210.

Television content is retrieved and displayed to a user on the user's client device, which may include the use of a TV application component, step 215. According to one embodiment of the invention, a TV application component retrieves content from a content data store based upon a user's selection of content from among a plurality of television shows or listings for television shows displayed to the user. For example, an electronic programming guide component may retrieve electronic program guide data from an EPG data store identifying one or more items of television content available to a user. An electronic programming guide may be displayed to the user for selection of one or more items of television content from the electronic programming guide. According to another embodiment of the invention, the television content retrieved and displayed to a given user is based upon the user's profile maintained in a profile data store. For example, a user's profile may maintain information identifying the age, location, sex, etc., of the given user. Exemplary methods for retrieving content based upon a user profile are described in commonly owned U.S. patent application Ser. No. 10/752,819 entitled "SYSTEM AND METHOD FOR ACCESSING SPECIALIZED CONTENT ASSOCIATED WITH BROADCAST CONTENT," the disclosure of which is hereby incorporated by reference in its entirety. A TV application component may retrieve and display content to a user based upon the one or more items of information maintained in the user's profile, according to methods further described herein. The content retrieved by a TV application component may comprise audio, video, text, images and combinations thereof.

A user's profile is further utilized to determine whether a given user has one or more buddies or whether the user is part of one or more social networks, step 220. For example, a user may subscribe to one or more instant messaging services, such as Yahoo! Messenger. An instant messaging service may allow a user to designate and save buddies with whom the user may communicate by delivering instant messages via the respective instant messaging application. According to one embodiment of the invention, a user may designate, in a user profile, the one or more instant messaging services to which the user has subscribed. Similarly, a user may designate-one or more buddies with profiles maintained on the system described herein. A messaging component may retrieve the identity of a user's one or more buddies that maintain profiles on the system described herein and may also retrieve the identity of the one or more buddies identified in each respective instant messaging application identified in the user's profile.

A check is performed to determine whether a given user has one or more buddies designated in one or more instant messaging applications or whether the user has one or more buddies that maintain profiles on the system described herein, step 220. If a user does have one or more buddies, a messaging component may retrieve the identity of the one or more buddies designated by the user in the one or more instant messaging applications or designated as buddies with profiles on the content distribution system, step 228. The messaging component may further determine whether any of a given user's one or more buddies are currently active, step 229. For example, a given buddy may be deemed active if the buddy has a profile and is currently logged in or accessing the content distribution system. Alternatively, or in conjunction with the foregoing, an inter-messaging component may be operative to communicate with one or more third party applications and the messaging component to identify whether a given buddy is logged into the third party application, which may include an instant messaging application.

If none of a user's one or more buddies are active, or if a user's profile does not identify one or more buddies, a profile component may be used to traverse the plurality of profiles maintained in a profile data store to select profiles of active users that match or are similar to the given user's profile, step 225. The one or more active users' profiles that match or are similar to the user's profile may be designated as the user's temporary buddies, step 225. For example, a given user's profile may specify that the user is thirty years old, lives in New York City, is a football fan and enjoys watching reality television shows. A profile component may traverse a plurality of user profiles stored in a profile data store and retrieve one or more profiles for active users that identify interests or preferences similar to those of the given user, e.g., a match on one or more profile fields. The one or more active users selected ("users like you") may be temporarily designated as the user's buddies.

After a user's buddies have been temporarily designated based upon the user's preferences and characteristics, step 225, or designated according to information maintained in the user's profile, step 228, the context of the user's one or more active buddies may be retrieved, step 230, which may include retrieval by a messaging component. According to one embodiment of the invention, a context may be a notion of an action that a given user is performing at a given point in time, which may also include the location from which the user is performing that action. For example, a context may be what the user is doing at a given point in time, e.g., watching a given TV channel, playing an on-line game, listening to music, conducting an on-line transaction, etc. Additionally, the avatar associated with each respective buddy is retrieved, wherein an avatar may comprise an identifier for a given buddy, step 235. For example, an avatar may comprise an image selected by a given buddy that identifies the given buddy.

The retrieved context of a user's one or more buddies may be displayed, along with each buddies' respective avatar, on a client device for a given user in conjunction with TV content being viewed by the given user, step 240. According to one embodiment of the invention, the context of a given user's one or more buddies is displayed as an image representing the context of a given buddy. For example, if a given buddy is viewing the television show "The Apprentice," an image associated with the television show may be displayed on the given user's client device. Similarly, if a given buddy is playing in an online poker room, an image of a poker room associated with the given buddy's context may be displayed on the given user's client device.

According to another embodiment of the invention, the context of a given user's one or more buddies is displayed on the user's client device. For example, if a given user is viewing a television show and a buddy associated with the user is playing in an online poker game, the buddy's context may be displayed in conjunction with the TV content being viewed by the given user, whereby the user may view the buddy's poker game as it occurs. Similarly, if a buddy associated with the user is listening to music from a particular artist, an image associated with the musical artist as well as the musical audio content may be delivered to the user's client device allowing the user to listen to the music associated with the given buddy. According to one embodiment of the invention, a messaging component identifies the contexts of the buddies of a given user and requests one or more items of content from a TV application component or another application component based upon the one or more buddies' identified contexts. The TV application component or another application component may retrieve content associated with the one or more buddies' contexts from a content data store, which may include television content, context representations, musical content, etc. The content retrieved is delivered to the user's client device, allowing the user to view the contexts of the user's one or more buddies.

A user may select a representation of the context associated with each respective buddy that is retrieved and displayed on the user's client device. According to one embodiment of the invention, a messaging component may identify the context of a user's one or more buddies, and instruct a TV application component to deliver an image, icon, audio content, streaming data, etc., representing a buddy's context to the user's client device. Using a remote control device, a user may navigate to the visual or audio representation of a given buddy's context. According to one embodiment of the present invention, a user may select the representation of a given buddy's context to change the given user's context to the selected buddy's context. For example, if a given user is viewing the television show "The Apprentice" and a given buddy is viewing the television show "The Practice," the user may select the representation of the buddy's context (viewing "The Apprentice"), which thereby causes the user's context to be changed to the buddy's context (viewing "The Practice").

A check is performed to determine whether the user selected a representation of a given buddy's context, step 245. If a user selects a representation of a given buddy's context the buddy's context is propagated to the user's client device, step 250. According to one embodiment of the invention, a messaging component retrieves the context of the buddy selected and instructs a TV application component to retrieve and deliver the context of the buddy to the user's client device. If a user does not select the representation of a given buddy's context, the user's context remains unchanged, step 255. The user may thereafter continue to review the content available to the user while also viewing the representations associated with the user's one or more buddies' contexts.

Figure 3:
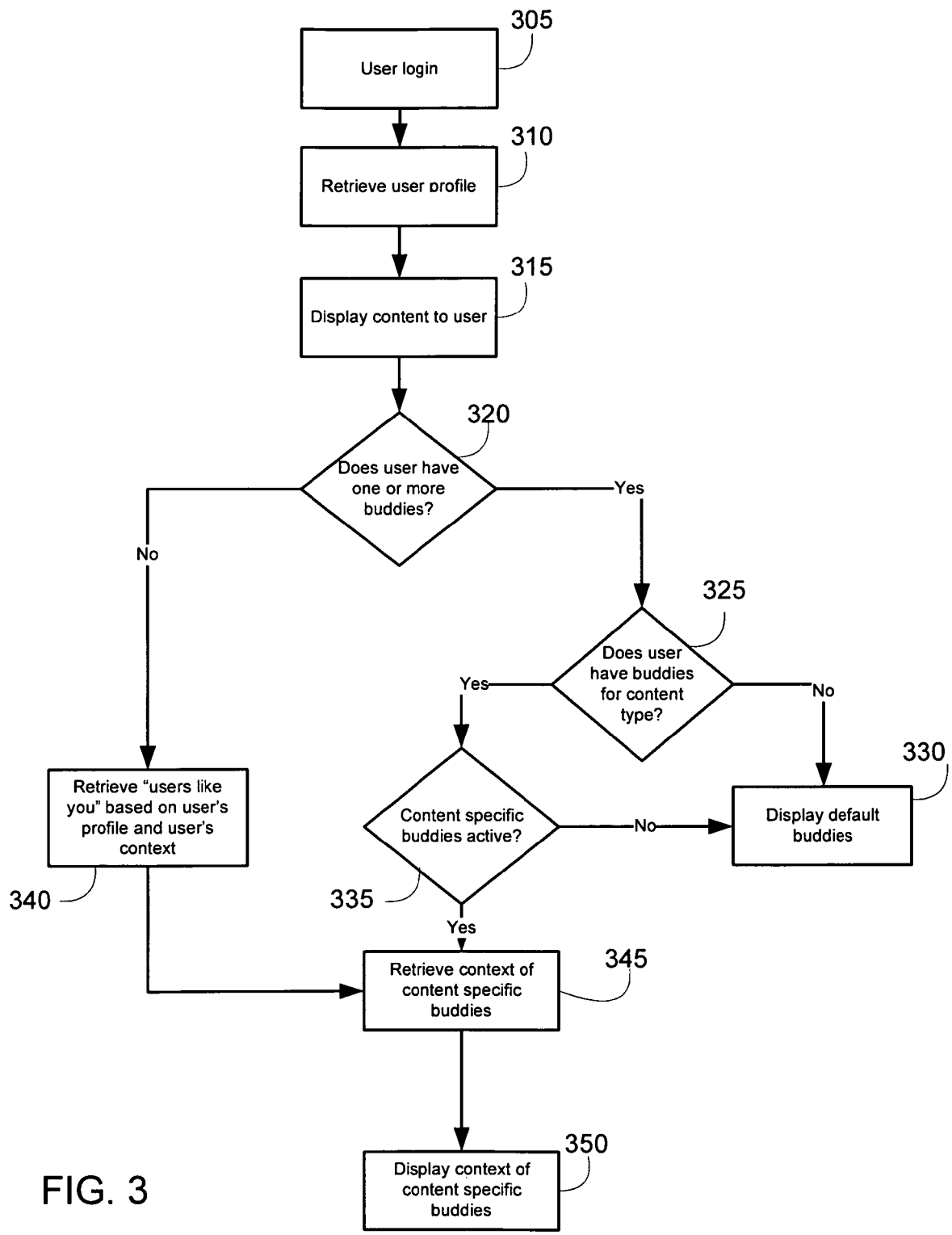
FIG. 3 is a flow diagram presenting a method for initializing a given user's session and retrieving the context of a given user's one or more buddies based upon the user's context according to one embodiment of the present invention.

FIG. 3 illustrates one embodiment of a method for retrieving and displaying the context of a given user's one or more buddies based upon the context of the given user. According to the method illustrated in FIG. 3, a user of a client device initializes and connects to a logon component, step 305, to verify the user's credentials as maintained in the user's profile, which may be retrieved by a profile component from a profile data store, step 310. A user may select from among a plurality of content available to the given user. For example, an electronic program guide component may search an EPG data store, operative to store one or more program guides, and display the one or more items of content available to a given user. A given item of content selected by a user may be retrieved from a TV application component and displayed on a given user's client device, step 315. The content retrieved by a TV application component may be retrieved from a content data store and may comprise a TV show, movie, broadcast data, video on demand ("VOD"), etc.

The context selected by a given user may be retrieved and delivered to a messaging component in order to identify one or more buddies associated with the given user's context. For example, a given user may select a television show displaying a football game between the New York Giants and the Cleveland Browns from an electronic program guide, which may be displayed on the user's client device. Additionally, the user's profile may be retrieved and used to determine whether the given user has one or more buddies associated with the context selected. Similarly, a given user may select a VOD horror movie, which may be displayed on the user's client device. The user's profile may be retrieved and used to determine whether the given user has one or more buddies associated with the context selected by the user, which may comprise a movie genre. According to one embodiment of the invention, a buddy may be an individual associated with a given user in one or more instant messaging applications to which the given user has subscribed, which may include an indication in a user profile. According to another embodiment of the invention, a buddy comprises an individual with a profile maintained on the content distribution system indicating interests or characteristics that match or are otherwise similar to those of a given user.

A check is performed to determine whether a user has one or more buddies, which may be identified in the user's profile, step 320. If the check performed at step 320 evaluates to true, an additional check is performed to determine whether a given user has one or more buddies or buddy lists associated with the context selected by the given user (e.g., context specific buddy), step 325. According to one embodiment of the invention, a context specific buddy may be a buddy associated with a user's particular context. For example, a given user may be an avid football fan and designate one or more buddies, who are also interested in football, as football buddies. According to another embodiment of the invention, a user may identify multiple buddy lists, wherein each buddy list may comprise one or more buddies associated with a given context. The one or more buddy lists may be maintained on the content distribution system or on a remote server coupled to the content distribution system. If a user does not have one or more context specific buddies or context specific buddy lists, step 325, the contexts of a user's default buddies may be displayed, wherein default buddies may comprise the one or more buddies not associated with any specific context, step 330.

If a user does not have one or more buddies, step 320, a profile component may traverse one or more profiles maintained in a profile data store to select one or more profiles of active users that are similar or match the profile for the given user, step 340. According to one embodiment of the invention, the profile component traverses a plurality of user profiles stored in a profile data store to identify one or more profiles that that identify interests or preferences similar to those of the given user, e.g., a match on one or more profile fields. The one or more profiles of active users retrieved from a profile data store that are similar or match a given user's profile may be temporarily designated as given user's buddies. Alternatively, or in conjunction with the foregoing, the profiles retrieved may be further selected based upon the given user's context, thus constituting context specific buddies.

A check is performed to determine whether a given user's one or more context specific buddies are active, step 335. If a given user's context specific buddies are not active, the user's one or more default buddies may be displayed, wherein a user's default buddies may comprise the user's one or more buddies not associated with any specific context, step 330. According to one embodiment of the invention, a given buddy is active if the buddy has logged into the content distribution system. If one or more a given user's context specific buddies are active, or after a user's one or more context specific buddies have been temporarily designated based upon the user's profile or context, the contexts of the one or more context specific buddies are retrieved, step 345, and displayed on the user's client device, step 350. According to one embodiment of the invention, an audio or visual representation of the contexts of a user's one or more buddies are displayed on the given user's client device. A user may interact with the one or more buddies displayed, such as through the use of an instant messaging or chat session.

Figure 4:
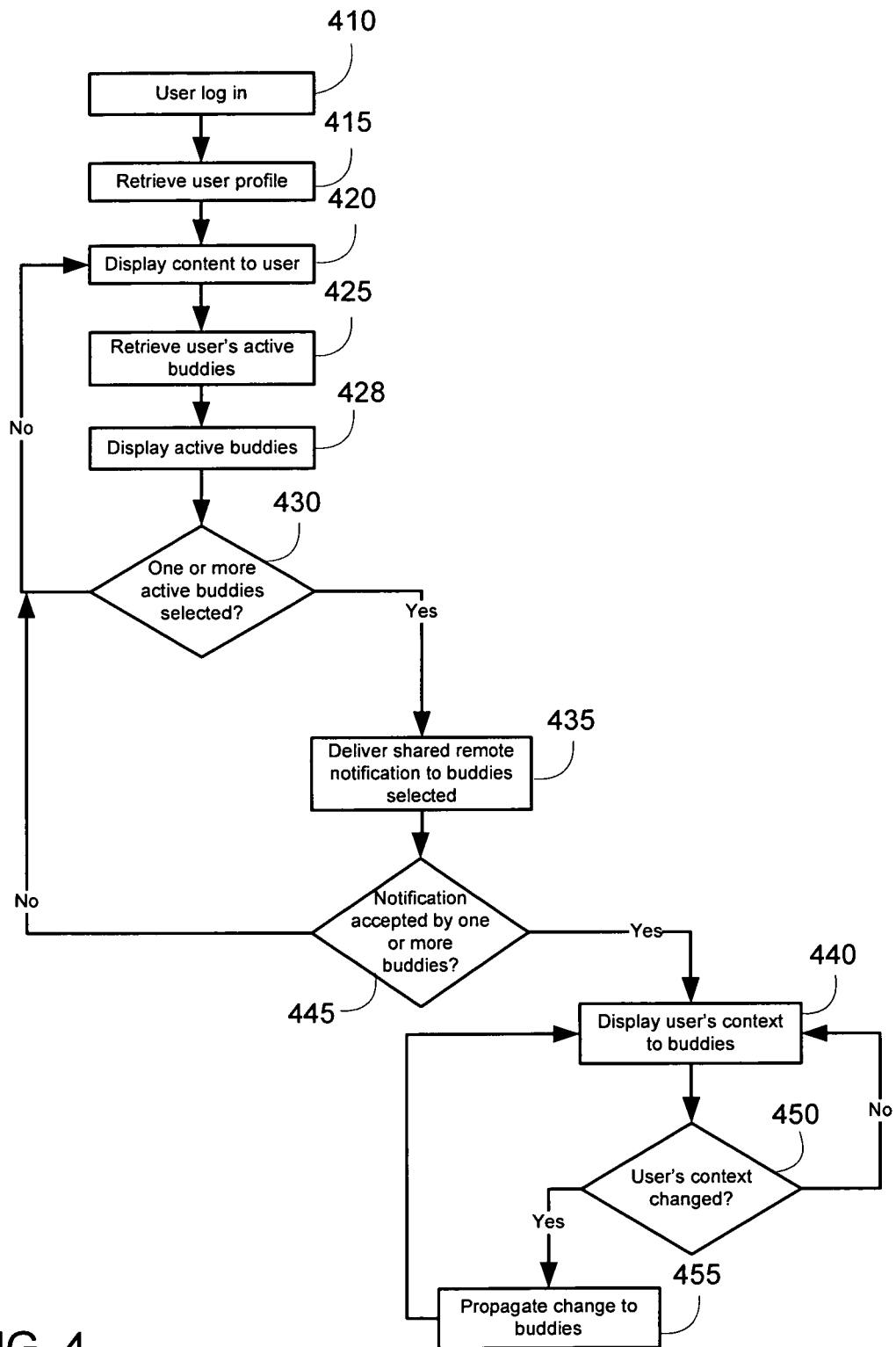
FIG. 4 is a flow diagram presenting a method for propagating a given user's context to one or more other users according to another embodiment of the present invention.

FIG. 4 illustrates one embodiment of a method for providing a user with control of the context of the user's one or more buddies. A user of a client device initializes and connects to a logon component, step 410, to verify the user's credentials as maintained in a user profile, which may be retrieved from a profile data store, step 415. A TV application component may provide content to the user for viewing on a client device, step 420. According to one embodiment of the invention, content is selected by a given user from a plurality of content displayed to a user, such as through an electronic program guide. According to another embodiment of the invention, content is retrieved based upon one or more characteristics in a user's profile, according to methods described herein.

A user's one or more active buddies are identified, step 425. According to one embodiment of the invention, a user's one or more buddies comprise individuals designated as buddies in one or more instant messaging applications as indicated in the given user's profile. According to another embodiment of the invention, a user's one or more buddies comprise one or more users with profiles maintained on the content distribution system. The one or more active buddies identified may be displayed on the user's client device with an audio or visual representation of each buddy's respective context, step 428. For example, an inter-messaging component operative to communicate with a third party instant messaging application may identify whether a given buddy is logged into the third party application. An audio or visual representation indicating the third party application that a given buddy is logged into may be displayed on the user's client device. Similarly, a messaging component may identify the one or more buddies logged into the content distribution system and retrieve the context of the one or more buddies for display on the user's client device.

A user may select one or more of the active buddies and deliver a shared remote control request to the one or more selected active buddies. A check is performed to determine whether the user selected one or more of the active buddies associated with the given user, step 430. If one or more active buddies are not selected, a shared remote control request is not generated or delivered to the one or more active buddies, and a user may continue to view the content displayed on the user's client device, step 420. If one or more active buddies are selected, step 430, a shared remote control request is delivered to the one or more active buddies selected, step 435. According to one embodiment of the invention, a shared remote control request comprises a request to allow a given user to control the one or more content items displayed on a given buddy's client device. For example, a client device may be operative to display a plurality of items, such as one or more television shows, an online poker game, instant messaging applications, etc. A shared remote control request that is accepted by a given buddy may allow the given user to control content that is displayed on the given buddy's client device.

A check is performed to determine whether one or more buddies associated with the user accepted the shared remote control request, step 445. If none of the selected buddies accepted the user's shared remote control request, the user does not gain control over the content displayed on the one or more selected active buddies' client devices. If one or more selected buddies accept the shared remote control request, step 445, the context of the user from which the shared remote control request originated is displayed on the one or more selected active buddies' client devices, step 440. For example, a user may be viewing the television show "Law and Order" and active buddies B1 and B2 associated with the user may be viewing the television shows "The Bachelor" and "The Practice," respectively. The user may select active buddies B1 and B2 and deliver a shared remote control request to both buddies. B1 and B2 may either reject or accept the shared remote control request. If both B1 and B2 accept the shared remote control request, B1's client device and B2's client device are updated to reflect the context of the given user. Similarly, if B1 accepts the shared remote control request and B2 rejects the shared remote control notification, B1's client device is updated to reflect the user's context, whereas B2's client device is not be updated. A check is periodically performed to determine whether the user's context has changed, such as where the user changes the television channel tuned to on his or her client device, step 450. If a user's context is not changed, no updates are made to the one or more active buddies that accepted the shared remote control request delivered by the user, step 440. Where a given user's context changes, the change is propagated to the one or more active buddies that accepted the shared remote control request delivered by the user, step 455, and the new context is displayed, step 440.

According to one embodiment of the invention, Infrared ("IR") signals are transmitted via a user's remote control to the user's set top box. A client application program interface may capture the IR signals and deliver the signals, via a client messenger application, to the content distribution system. The signals received by the content distribution system may be delivered to a messaging component, which may identify the one or more buddies that accepted the shared remote control request. The messenger component may propagate the signal to the set top boxes of the buddies that accepted the shared remote control request to reflect the user's context. Those of skill in the art recognize other methods for delivering a signal reflecting a user's context to one or more set top boxes.

Figure 5:
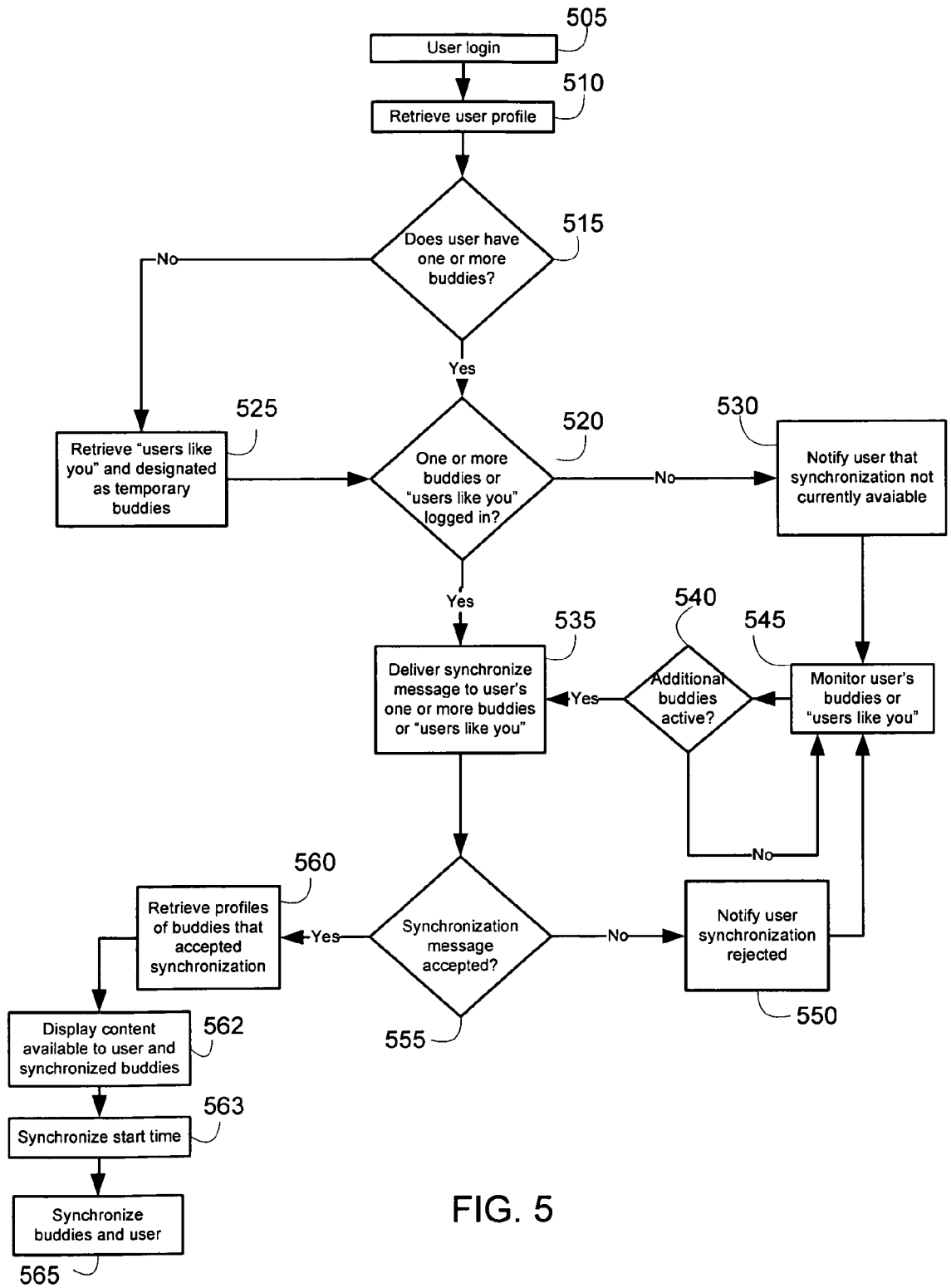
FIG. 5 is a flow diagram presenting a method for synchronizing the context of one or more users to engage in a community viewing environment according to one embodiment of the present invention.

FIG. 5 illustrates one embodiment of a method for facilitating community viewing and interaction in a given context. A user of a client device initializes and connects to a logon component, step 505, which may include verifying the user's credentials as maintained in the user's profile, step 510. Upon verifying a user's credentials, a check is performed to determine whether the given user has one or more buddies, step 515, which may include accessing a user profile. According to one embodiment of the invention, a user's one or more buddies may be identified based upon the one or more instant messaging applications to which the given user has subscribed, which may be indicated in the user's profile. According to another embodiment, a user's buddies may comprise individuals with profiles maintained on the content distribution system.

If the user profile retrieved does not identify one or more buddies for the given user, a search is performed for "users like you," step 525. According to one embodiment of the invention, "users like you" comprise other users with profiles maintained on the content distribution system that match or are similar to a given user's profile with respect to characteristics identified in the user's profile including demographics, frequently viewed content, etc. For example, if a user's profiles identifies that the user is located in Houston, Tex., is forty-two years old and enjoys horror movies, profiles with similar age, preferences, location, etc., characteristics may be retrieved. The one or more profiles retrieved constituting "users like you" may be designated as a user's temporary buddies, step 525.

Where a user's profile identifies one or more buddies, or after one or more profiles are retrieved constituting a match with the given user's profile and designated as temporary buddies, a check is performed to determine whether any of the user's one or more buddies are logged in to the content distribution system, step 520. If none of a user's buddies are logged on to the content distribution system, the user is notified of such, step 530. The user's one or more buddies may be monitored to determine whether any of the user's one or more buddies become active.

If one or more of a user's buddies are identified as active, step 520, the user may deliver a synchronization request to the one or more user's buddies, step 535. According to one embodiment of the invention, a synchronization request comprises an invitation delivered to one or more users to engage in community viewing. For example, the synchronization of a given user with one or more buddies may result in the user and one or more buddies engaging in a "movie theater" type viewing environment, wherein the user and one or more buddies view the same television show, movie, etc., at the same time while engaging in instant messaging or chat sessions.

The synchronization request delivered by a given user may be rejected or accepted by the user's one or more buddies, step 555, which may be a subset of the user's active buddies. If the synchronization request is rejected by selected buddies associated with a given user, the user is notified of such, step 550. The user's one or more buddies, or a subset of the user's buddies, may thereafter be monitored to determine whether any additional buddies associated with the user logon to the content distribution system, step 545. A check is periodically performed to determine whether one or more additional buddies have logged on to the system described herein, step 540. If one or more additional buddies associated with the given user logon to the content distribution system, the synchronization request may delivered to such buddies, step 535.

If the synchronization request is accepted by selected buddies associated with the given user, the profiles of the one or more buddies are retrieved, step 560. According to one embodiment of the invention, the profiles of the one or more buddies are used to identify the location of the one or more buddies as well as the content available to each respective buddy. For example, a user's one or more buddies may be located in various locations throughout the United States, the world, etc. Because of time zone differences, programming differences, etc., content available to a given user may not be available to a given buddy at the same time, on the same channel, etc. A user's profile may be used to identify the location of the user and the content available to the user. Similarly, the profiles of a user's one or more buddies may be used to identify the content available to each respective buddy.

According to one embodiment of the invention, the profiles retrieved for the user and the one or more buddies may be used by an electronic program guide component to identify content maintained in a content data store that is available to the user and the one or more synchronized buddies. For example, a given user's profile may indicate that the user is located in New York City, and a given buddy's profile may indicate that the buddy is located in San Francisco. Because of time zone differences, content available to the buddy located in San Francisco may not be available to the user located in New York City until hours later. Using the profiles associated with the user and the buddy, the electronic programming guide component may identify content, maintained in a content data store, which is available simultaneously to both individuals. According to another embodiment of the invention, the profiles retrieved for the user and the one or more buddies may be used to identify content maintained on the user's or one or more buddies' client devices. For example, the user's and one or more buddies' client devices may be operative to record content, such as a client device with digital video recording ("DVR") functionality. The profiles for the user and one or more buddies may be used to identify content that is maintained on such devices.

The content available to the user and the user's one or more synchronized buddies may be displayed to the user and one or more synchronized buddies, step 562. The user and one or more synchronized buddies may select a given item of content using a variety of methods. For example, a voting scheme may be used whereby the user and each synchronized buddy votes for the item of content they wish to view. The item of content receiving the greatest number of votes may be selected for display to the user and one or more synchronized buddies. Similarly, control may be granted to the user or a given synchronized buddy, who may select the item of content that is to be viewed by the user and the one or more synchronized buddies. Those of skill in the art recognize other techniques for selecting an item of content available to a plurality of users.

The user and one or more buddies may thereafter synchronize the starting time for the item of content selected, step 563, wherein a starting time may comprise when a given item of television content is to be delivered to the user's and one or more buddies' client devices. According to one embodiment of the invention, a messaging component is operative to select a start time that is N minutes after an item of content has been selected by the user and one or more synchronized buddies. The messaging component may instruct a TV application component to deliver the content selected to the user's and one or more buddies' client devices at the start time selected. According to another embodiment of the invention, the user and one or more synchronized buddies may select a start time for the item of content selected. According to yet another embodiment of the invention, control may be granted to the user or one of the synchronized buddies, allowing the user or given synchronized buddy to select the start time for the item of content selected. The start time selected may be delivered to the messaging component, which may be operative to instruct the TV application to deliver the item of content selected at the start time selected.

The item of content selected is displayed on each of the synchronized buddy's client devices as well as the user's client device at the synchronized start time, step 565. The user and the one or more synchronized buddies are thus able to simultaneously view the same item of content in a variety of locations on a plurality of client devices. According to one embodiment of the invention, additional services may be provided to the user and one or more synchronized buddies for communication. For example, an instant messaging application may be displayed in conjunction with the item of content selected, allowing the user and one or more synchronized buddies to engage in an instant messaging or chat session during display of the selected content item. Those of skill in the art recognize other applications that may allow for communication or interaction among a plurality of viewers in a community-viewing environment.

Figure 6A:
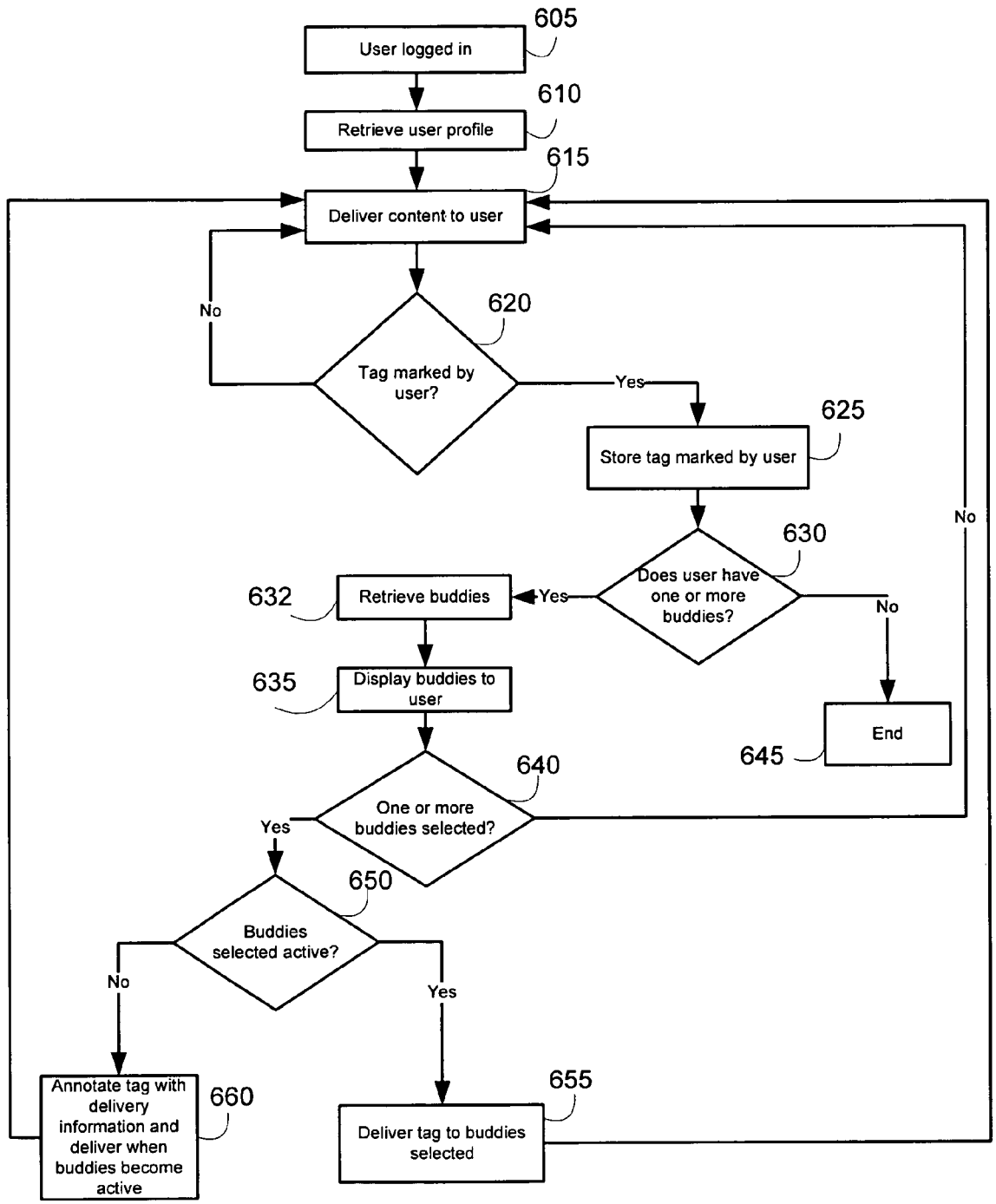
FIG. 6A is a flow diagram presenting a method for tagging content for delivery to one or more buddies of a given user according to one embodiment of the present invention.

FIG. 6A illustrates one embodiment of a method for facilitating the tagging and delivery of one or more content items to one or more buddies associated with a given user. A user of a client device initializes and connects to a logon component, step 605, to verify the user's credentials as maintained in the user's profile, which may be retrieved from a profile data store, step 610. Content is retrieved and delivered to the user's client device, step 615, which may include the receipt of television content. According to one embodiment of the invention, a user may select the content retrieved and delivered to the user's client device using an electronic programming guide. For example, an electronic program guide component may search an EPG data store, which may be operative to store one or more program guides, and display the one or more items of content available to a given user. A given item of content selected by a user may be retrieved from a TV application component and displayed on a given user's client device, step 615.

According to the embodiment illustrated in FIG. 6A, a user viewing content on a given client device may tag, or otherwise mark an item or portion of an item of content for delivery to one or more buddies associated with the user. A tag may comprise "start" and "stop" delimiters, identifying a portion of content that a user wishes to deliver to one or more buddies associated with the user. For example, a user viewing a television show or movie may enjoy a particular scene and may wish to share the scene with one or more buddies. A user may thus tag the desired item of the television show, using start and stop tags, and deliver the tagged scene to one or more buddies. According to one embodiment of the invention, a given item of content that is tagged may be recorded to a user's client device. For example, a user of a client device with digital recording functionality ("DVR") may locally record the content identified by the start and stop tags. According to another embodiment of the invention, tags may comprise identifiers that may be used to provide direct access to the tagged item of content. For example, a user may wish to tag a ten second scene in a two-hour movie. A start tag may identify the hour, minutes, and seconds where the scene beings, and a stop tag may identify the hour, minutes and seconds where the scene ends. The start and stop tags may be delivered to one or more buddies, providing the one or more buddies with direct access to the tagged item of content.

As content is displayed on a given user's client device, a check is periodically performed to determine whether the user has elected to tag the content being displayed, step 620. If a user does not enter any tagging information, content continues to be displayed on the client device, step 615, and the user may continue to select content from among the plurality of content available to the user. If a user enters a tag, the tag marked by the user is saved, step 625. According to one embodiment of the invention, the content tagged by the user is saved locally on the user's client device or remotely on another device operative to record content. For example, a client device with digital video recording functionality ("DVR") may provide the user with the ability to locally record a given item of tagged content. Alternatively, the tagged content may be recorded and stored in a remote content store operative to store one or more items of content. According to another embodiment of the invention, the content tagged by a user may be identified with start and stop identifiers. For example, start and stop identifiers may be stored and delivered to one or more buddies so as to provide a user's one or more buddies with direct access to the tagged item of a given television show, movie, etc. According to yet another embodiment invention, the content tagged by a user may be identified with offsets or pointers identifying a location in a given item of digital content. For example, a given offset or pointer may be delivered to one or more buddies identifying a location in an item of digital content. A given buddy may select the offset or pointer, thereby gaining direct access to the location in the item of content specified by the user.

A check is performed to determine whether a user has one or more buddies, step 630. If a user's profile does not identify one or more buddies for the given user, processing ends, step 645. The one or more tags saved locally on a user's client device or saved remotely on a device operative to store one or more tags may be later retrieved and viewed by the given user.

If a user's profile identifies one or more buddies, step 630, the one or more buddies may be retrieved, step 632, and displayed to the given user on the user's client device with audio or visual context representations associated with each respective buddies' context, step 635. A user may select one or more of the buddies displayed in order to designate the buddies as intended recipients of the tagged item of content. For example, using a selection device such as a remote control or mouse, a user may select one or more audio or visual context representations associated with the user's one or more buddies' contexts to identify the intended recipients of the tagged item of content. A check is performed to determine whether a user has selected one or more buddies, step 640. If a user does not select any buddies, the tagged content is not delivered to any of the user's one or more buddies and a user may continue to select content from among the plurality of content available to the user, step 615. The tagged content saved on the user's client device or remotely on a device operative to store one or more tags may later be retrieved and viewed by the given user.

If the user selects one or more buddies, a check is performed to determine whether any of the one or more selected buddies are active, step 650. If one or more of the user's buddies are identified as active, the tagged content is delivered to the respective buddies and may be viewed or saved by each respective recipient, step 655. For example, a messaging component operative to identify a user's one or more buddies may instruct a local or remote storage device to deliver the given item of tagged content to the user's one or more selected buddies. If none of the selected buddies are active, the tagged content may be annotated with delivery information identifying the one or more recipients that are to receive the tagged content, step 660, and delivered when the one or more identified recipients becomes active. For example, a selected buddy may receive a notification of the tagged content upon logging on to the content distribution system. Similarly, an inter-messaging component, operative to communicate with one or more third party instant messaging applications, may determine when a selected buddy logs onto the third party application instant messaging application and may deliver the tagged content to the selected buddy. Thereafter, a user may continue to retrieve and view the plurality of content available to the user, step 615, and identify additional tags for delivery to the user's one or more buddies.

While FIG. 6A illustrates a method for tagging one or more items of content and delivering tags and tagged content to one or more buddies associated with a given user, the content distribution system illustrated in FIG. 1 may further be used to select an item of content in an electronic programming guide and deliver the selection to one or more buddies associated with a given user. According to one embodiment of the invention, an electronic program guide component may deliver an electronic programming guide to a given user's client device identifying the one or more items of content available to a given user. A user may select one or more of the items of content identified in the electronic programming guide in order to view, record, etc., the one or more items of content selected. For example, a user may select a given item of content to arrange a date and time for recording the item on the user's client device. Similarly, the user may choose to select an item of content in order to automatically tune the user's client device to the item of content selected when the item is available.

A given user's selections from an electronic programming guide may be delivered to one or more buddies associated with the given user. According to one embodiment of the invention, a messaging component operative to identify a user's one or more buddies delivers a notification to the user's one or more buddies. The notification notifies the one or more buddies of the one or more items of content selected by the user from the electronic programming guide. For example, a messaging component may deliver a notification to a user's one or more buddies indicating the one or more items of content that the user has selected from an electronic programming guide for recording. Similarly, the messaging component may deliver a notification to a user's one or more buddies indicating the one or more items of content that will be automatically delivered to the user's client device when available.

Figure 6B:
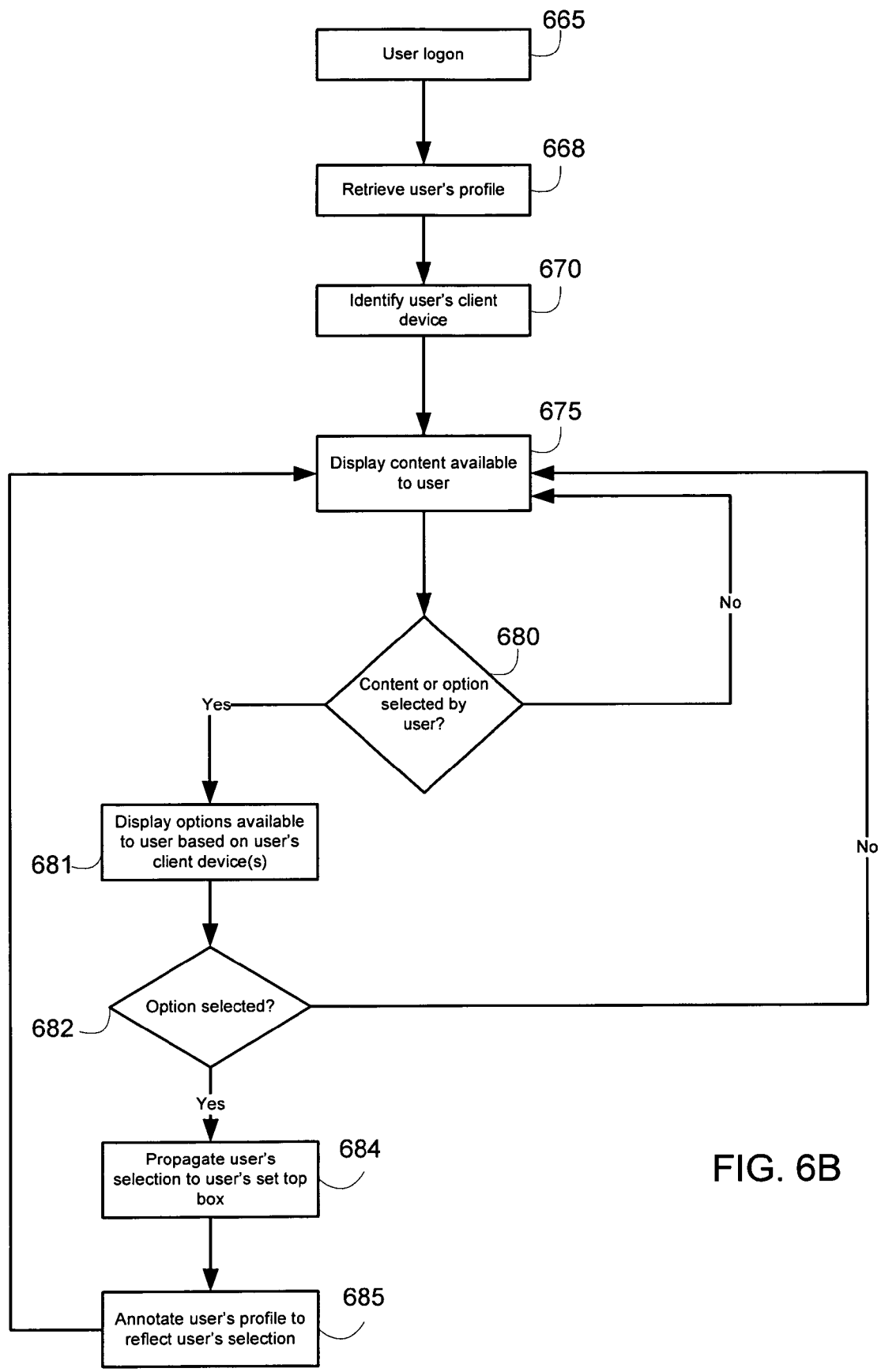
FIG. 6B is a flow diagram presenting a method for remotely accessing a user's profile to identify and interact with the content delivered to the user's set top box according to one embodiment of the present invention.

FIG. 6B is a flow diagram illustrating one embodiment of a method for facilitating web remote access of a user's set top box, digital video recorder ("DVR") or other client device to control and interact with the content delivered to the user's one or more client devices. A user may remotely access the content distribution system via a client device ("remote access client device") communicatively coupled to a web server operative to retrieve and display a logon page for the content distribution system. According to one embodiment of the invention, a remote access client device communicatively coupled to the Internet may access the content distribution system via a web browser that may display a logon web page for the content distribution system.

As illustrated in FIG. 6B, a user may remotely logon to the content distribution system, step 665, using a remote access client device coupled to a web server operative to retrieve and display a logon web page for the content distribution system. According to one embodiment of the invention, a user of a remote access client device initializes and connects to a logon component via the Internet to verify the user's credentials as maintained in the user's profile, which may be retrieved from a profile data store, step 668. The profile retrieved for the given user may provide information on the one or more client devices associated with the user and coupled to the user's one or more set top boxes, step 670. For example, a user may have previously registered one or more client devices associated with the user, such as digital video recorders ("DVR") or high definition televisions that may be coupled to the user's one or more set top boxes. The functionality of the one or more client devices associated with the user and coupled to the user's one or more set top boxes may be identified in the user's profile or determined by the content distribution system. For example, the content distribution system may determine whether a given client device associated with the user and coupled to the user's one or more set top boxes is capable of recording items of content, displaying items of content in high-definition format, etc.

The profile retrieved for the user may be further used by the content distribution system to identify the content delivered to the user's one or more set top boxes. According to one embodiment of the invention, the content distribution system identifies the one or more electronic program guides available on a user's one or more set top boxes. The data from one or more electronic program guides stored and available on a user's one or more set top boxes may be displayed to the user on the user's remote access client device, step 675. A user may select one or more items of content available to the user's one or more set top boxes as displayed in the one or more electronic program guides on the user's remote access client device. For example, using a selection device coupled to the remote access client device such as a keyboard or a mouse, a user may select one or more items of content from the one or more electronic program guides available to the user.

A check is performed to determine whether the user selected one or more items of content displayed on the user's remote access client device, step 680. If a user does not select any items of content available to the user, the user may continue to browse the one or more items of content available, step 675. When the user selects one or more items of content, step 680, the user is presented with one or more options for interacting with the one or more items of content selected, step 681. According to one embodiment of the invention, the one or more options available to the user are based upon the functionality of the user's one or more client devices, as identified in the user's profile. When the user selects an item of content from the one or more items of content displayed to the user via an electronic program guide on the remote access client device, the user may be presented with an option to record the item of content selected on the user's DVR. Similarly, a user's set top box may be further coupled to a high definition television. When the user selects an item of content, the user may be presented with an option to receive the item of content selected in non-high-definition format or in high-definition format. Further, a user may schedule a time for tuning the user's television to an item of content selected. Those of skill in the art recognize other options that may be available to a given user based upon the one or more client devices coupled to a user's one or more set top boxes, including recording an item of content, changing recording options, deleting a previously recorded item of content, selecting an item of content for automatic tuning, etc.

A check is thereafter performed to determine whether a user selected one or more of the options available to the user for the one or more items of content selected, step 682. If a user does not select any of the one or more options available for the one or more items of content selected, the user may continue to browse the plurality of content available to the user, step 675. When a user selects one or more of the of the options available for the one or more items of content selected, the user's selection is propagated to the user's one or more set top boxes, DVRs, or other client devices, step 684. According to one embodiment of the invention, the user's selection is delivered by the content distribution system's messaging component to the one or more set top boxes associated with the given user. For example, a user may select the option to record an item of content available to the user at a particular time. The user's selection is delivered to the user's set top box or DVR, which then carries out the command to implement the selection. A user's profile may be annotated to reflect the one or more items of content selected by the user, step 685, to provide the user with recommendations for items of content, according to methods described herein.

Figure 7:
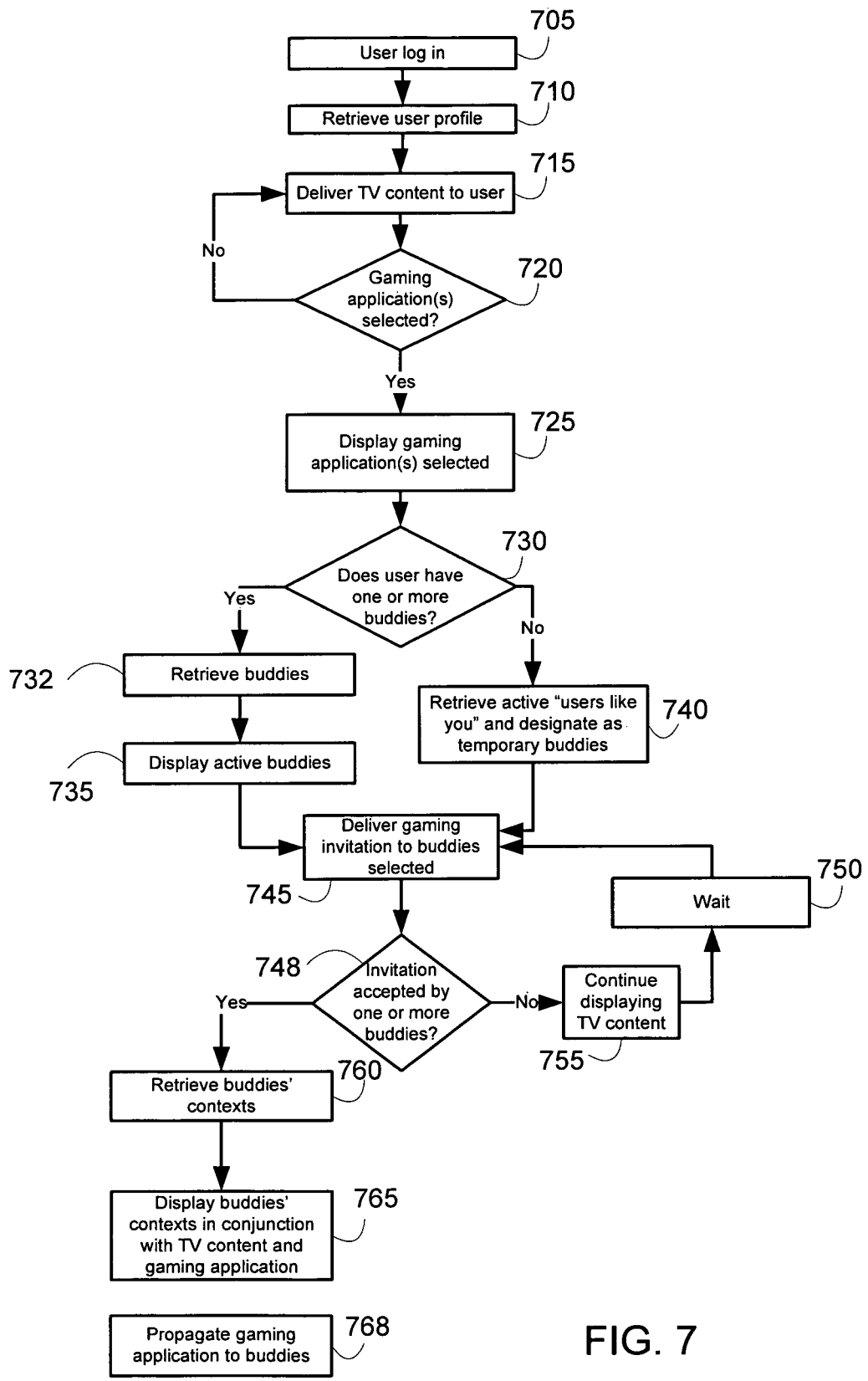
FIG. 7 is a flow diagram presenting a method for simultaneously viewing television content while participating in a gaming application according to one embodiment of the present invention.

FIG. 7 is a flow diagram illustrating one embodiment of a method for facilitating the use of a client device for viewing television content and interacting with one or more other applications. A user of a client device initializes and connects to a logon component to verify the user's credentials, step 705. Additionally, a user's profile is retrieved to identify the user's location, preferences, etc, step 710. Content is retrieved and delivered to the user's client device, step 715. According to one embodiment of the invention, a user may select the content retrieved and delivered to the user's client device using an electronic programming guide. For example, an electronic program guide component may search an EPG data store, operative to store one or more program guides for one or more locations and display the one or more items of content available to a given user. The one or more program guides retrieved may be retrieved based upon the location identified in the user's profile. A given item of content selected by a user may be retrieved from a TV application component and displayed on a given user's client device.

According to the embodiment illustrated in FIG. 7, a user may simultaneously view television content while engaging in a gaming application with one or more buddies associated with the given user. For example, one or more games, such as gaming applications available on the Internet, may be displayed on the user's client device. A user may select the one or more gaming applications available in order to invoke the respective gaming application.

A check is performed to determine whether a user has selected one or more gaming applications, step 720. If a user does not select a gaming application, television content continues to be displayed on the given user's client device, step 715. A user may continue to select content from among the plurality of content available to the given user, as well as browse the one or more gaming applications available to the user. In contrast, if a user selects one or more gaming applications, step 720, the one or more gaming applications may be executed and displayed on the user's client device, step 725. According to one embodiment of the invention, the one or more gaming applications selected are delivered to a user's client device and locally executed. According to another embodiment of the invention, the one or more gaming applications selected are executed remotely and displayed on a given user's client device. The one or more gaming applications may be displayed in conjunction with the television content displayed on a given user's client device thus allowing the user to view television content as well as participate in the one or more gaming applications selected.

A check is performed to determine whether a user has one or more buddies, as identified in the user's profile, step 730. The user's one or more buddies may be displayed to the user to permit the user to select one or more buddies to take part in the gaming application selected, step 730. If a user has one or more buddies, the identity of the one or more buddies is retrieved, step 732. Furthermore, the active buddies among the user's one or more buddies are identified and displayed to the user, step 734.

If a user is not associated with one or more buddies, one or more profiles stored in a profile data store may be retrieved to identify other users with similar or matching interests, characteristics, etc., to those of the given user, step 740. For example, a profile component may be operative to identify one or more profiles in a profile data store that identify user preferences that are similar to the current user. The one or more other users identified by a profile component may be designated as temporary buddies in order to allow the current user to engage in the gaming application selected.

A messaging component may deliver an invitation to the one or more active buddies identified by a user's profile or selected by a profile component to participate in the one or more gaming applications selected by the user, step 745. A recipient of a gaming application invitation may either accept or reject the gaming invitation, step 748. If none of the recipients of the user's gaming invitation accept the invitation, the user is notified of such, and may continue to view the television content being displayed, step 755. The messaging component may pause for a given period of time, step 750, and thereafter redeliver the one or more invitations to the user's one or more buddies, step 750. If one or more the recipients of the user's gaming invitation accept the invitation, the context of the one or more buddies who accepted the invitation is retrieved, step 760.

The context of the one or more buddies may be displayed on the user's client device, step 765. For example, a user's client device may display an audio or visual representation of the one or more buddies' contexts. Additionally, the gaming application selected by the user is propagated to each buddy who accepted the gaming invitation, step 768. For example, if a user selects a poker gaming application and a given buddy is viewing a television show, upon accepting the gaming invitation, the buddy's client device may display both the television show and the gaming application. The user and one or more buddies who accepted the gaming invitation may thereafter engage in the gaming application selected.

It should be noted that while FIG. 7 illustrates the use of a gaming application in conjunction with the viewing of television content, according to another embodiment of the invention, one or more other applications may be selected and executed in conjunction with television content, wherein other applications may comprise applications executable locally on a client device or remotely on a device operative to execute one or more applications for display on the client device.

Figure 8:
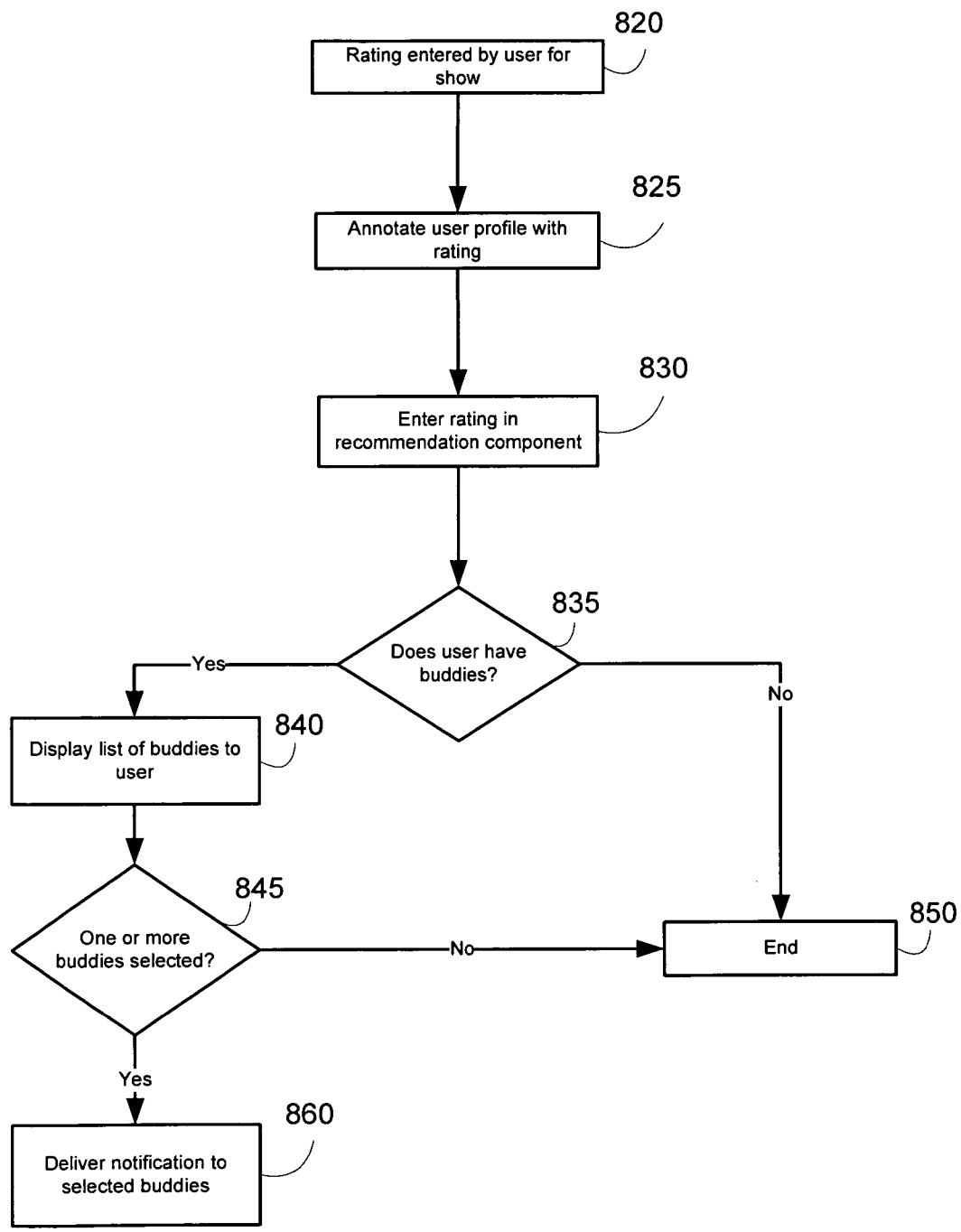
FIG. 8 is a flow diagram presenting a method for entering a rating for a given item of content and propagating the rating to one or more buddies associated with a given user according to one embodiment of the present invention.

The content distribution system illustrated in FIG. 1 may further be used to provide users with the ability to enter ratings and receive recommendations for one or more items of content. FIG. 8 is a flow diagram illustrating one embodiment of a method for entering a rating for a given item of content and delivering the rating to a user's one or more buddies.

During or after the display of an item of content, which may include television content, a user may be presented with an option to enter a rating for the given item of content, step 820. According to one embodiment of the invention, a user is presented with a graphical user interface allowing the user to enter one or more ratings for a given item of content. A rating may comprise an indication of the user's opinion of the item of content. For example, a user may indicate whether the content was favorable using a "thumbs up" icon or unfavorable using a "thumbs down" icon. Similarly, a user may enter ratings for one or more categories or characteristics associated with the item of content. For example, if a user is viewing a horror film, the user may provide a rating for one or more of the actors, the level of scariness of the film, the suspense of the film, etc. Furthermore, a user may also enter rating information for other applications, including gaming applications, web sites, etc. For example, a user participating in an online gaming application may provide a rating indicating whether the game is challenging, whether the graphics are appealing, etc. Those of skill in the art recognize other types and characteristics of content that may be rated by a given user.

A user's profile may be annotated with the rating entered by the user for the given item of content to provide the user or the user's one or more buddies with recommendations for additional content, step 825. A user's profile annotated with rating information may be used to determine content that the user may enjoy and alert the user when such content is available. For example, a recommendation component may inspect a user's profile annotated with a plurality of ratings to identify one or more items of television content that the user may enjoy based upon the user's previous ratings. A recommendation component may direct a TV application to retrieve one or more items of content from a content data store and deliver the items of content to a user's client device based upon the user's ratings. Similarly, a recommendation component may inspect a user's profile and instruct another application component, operative to store other applications, such as gaming applications, to deliver the respective applications to a user's client device based upon the user's ratings.

The user's rating may further be stored in a recommendation component operative to store one or more user ratings for items of content to allow the user's rating to be propagated to the user's one or more buddies or utilized to provide recommendations to additional users, step 830. A check is performed to determine whether the user has one or more buddies as identified in the user's profile, step 835. If a user does not have one or more buddies, processing ends, with storage of the user's rating, step 850. If a user does have one or more buddies, an audio or visual representation of each buddy's context may be displayed on the user's client device to allow the user to select one or more of the buddies, step 840. A check is performed to determine whether the user selected one or more buddies, step 845. If a user does not select one or more buddies, processing ends. If one or more of the buddies are selected, each respective buddy selected may receive a notification of the user's rating for the given item of content, allowing the user's one or more buddies to base their selections of content on one or more buddies' ratings, step 860. For example, a buddy logged onto the content distribution system may receive an alert notifying the user of the rating. Similarly, a buddy not logged onto the content distribution may receive a notification upon logging onto the content distribution system notifying the buddy that a user has rated a given item of content. Alternatively, or in conjunction with the foregoing, a buddy may receive an alert via an email application, instant messaging application, etc., notifying the buddy of the user's rating for the given item of content.

Figure 9:
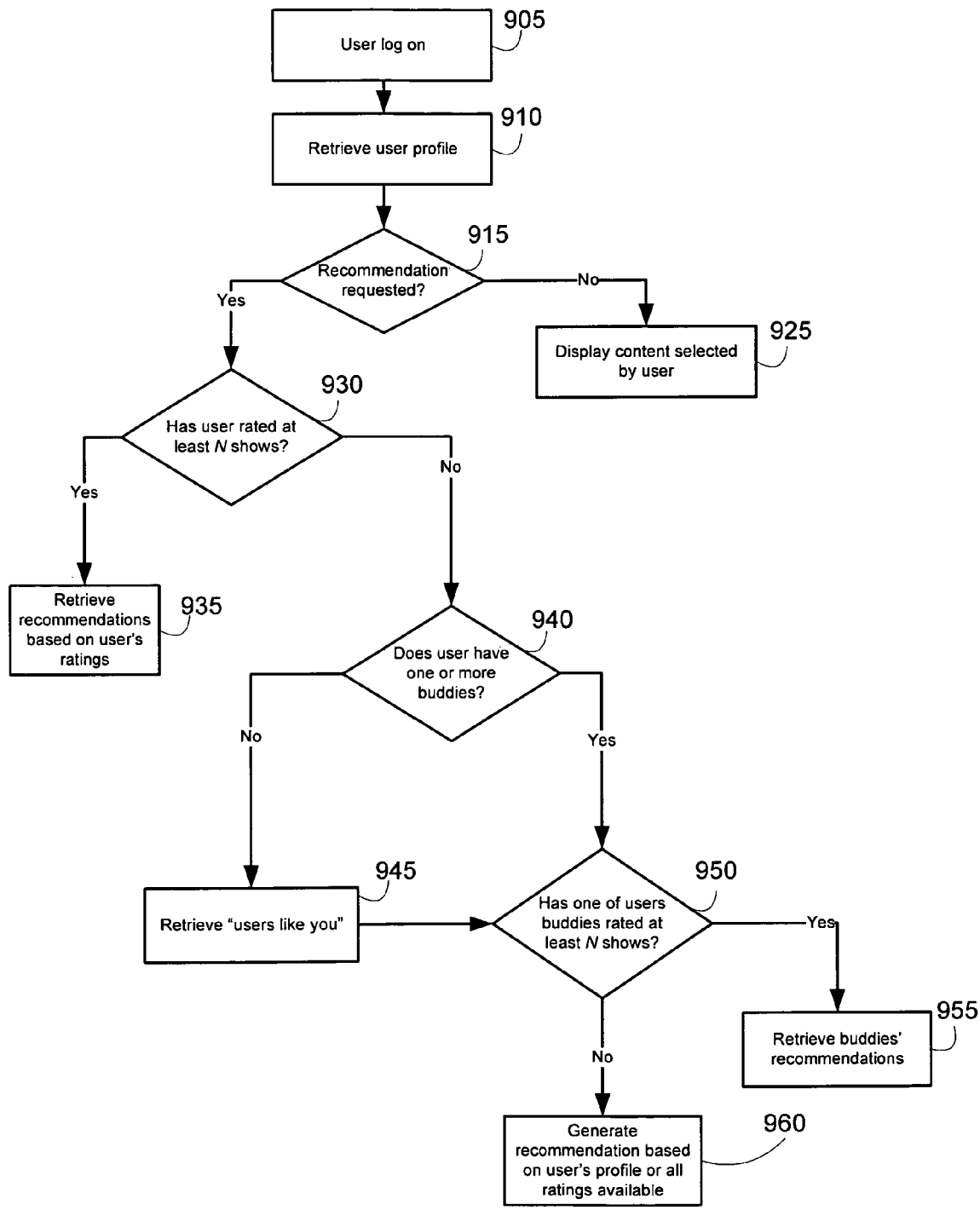
FIG. 9 is a flow diagram presenting a method for retrieving a recommendation based upon one or more ratings according to one embodiment of the present invention.

The ratings entered by one or more users of the system described herein may be utilized to provide recommendations for one or more items of content. FIG. 9 is a flow diagram illustrating one embodiment of a method for generating one or more recommendations based upon ratings entered by one or more users. According to the embodiment illustrated in FIG. 9, a user may logon to the content distribution system via a logon component, step 905. A profile component may retrieve a user's profile from a profile data store to verify the user's credentials, step 910. A user logged into the content distribution system may make a request for a recommendation for an item of content, wherein an item of content may comprise television content, gaming content, Internet content, etc. A check is performed to determine whether a user has requested a recommendation, step 915. If a recommendation is not requested, the plurality of content available to the user may be displayed, allowing the user to select one or more items of content, step 925. Where a user submits a request for a recommendation, a further check is performed to determine whether the user has provided ratings for at least N items of content associated with the recommendation sought, step 930. According to one embodiment of the invention, a recommendation component inspects the user's profile to determine whether the user's profile is annotated with one or more ratings for the type of content selected. For example, if a user requests a recommendation for a mystery movie, a check is performed to determine whether the user has rated at least N mystery movies or television shows, wherein N may comprise a threshold. A recommendation component may inspect the user's profile to determine whether the user has rated at least N mystery movies or television shows.

If a user has rated at least N items of content associated with the type of content selected, the recommendation component may generate a recommendation based upon the user's one or more ratings, step 935. For example, a profile annotated with three different ratings for mystery films may identify that the given user enjoys a particular actor and enjoys black and white films. The recommendation component may generate a recommendation based upon the user's previous ratings and deliver a request to a TV application component to retrieve one or more items of content from a content data store that match the user's preferences. A threshold may be used to increase the accuracy of the recommendation made by the recommendation component. For example, a profile with only one mystery movie rating may not provide enough information for the recommendation component to make an accurate recommendation. Therefore, a threshold may be used to increase the likelihood that the recommendation component calculates a recommendation that matches a given user's preferences.

If a user has not rated at least N items of content related to the type of recommendation requested, a check is performed to determine whether the given user has one or buddies, step 940. According to one embodiment of the invention, a user's profile is used to determine the one or more buddies designated by the user. The profiles of one or more buddies identified in a given user's profile may be used to provide recommendations for one or more items of content.

According to the embodiment illustrated in FIG. 9, if a user's profile does not identify one or more buddies, a search is performed to identify users of the content distribution system with profiles identifying similar or matching preferences with those of the given user, step 945. According to one embodiment of the invention, a profile component traverses the plurality of profiles that may be stored in a profile data store to identify users with preferences that match or are similar to those of the given user. For example, if a user's profile indicates that the user is sixty-eight years old, lives in Greenwich Conn. and enjoys movies with the actor Marlon Brando, one or more profiles with similar characteristics and preferences may be retrieved and designated as a user's temporary buddies in order to provide the user with one or more recommendations.

If a user's profile identifies one or more buddies, or after one or more temporary buddies have been designated for the user using one or more matching or similar profiles, a check is performed to determine whether any of the one or more buddies has rated at least N items of content related to the recommendation sought by the given user, step 950. For example, if a user is seeking a recommendation for a gaming application, a check is performed to determine whether any of the one or more buddies has rated at least N gaming applications. If one or more of a user's buddies has rated at least N items of content associated with the type of content sought by the given user, a recommendation component may generate a recommendation based upon the one or more ratings from the user's one or more buddies, step 955. For example, if a user is seeking a recommendation for a gaming application and a buddy associated with a user has rated eight gaming applications, the recommendation component may generate a recommendation based upon the gaming application that received the highest rating from the buddy. Similarly, if a user has a plurality of buddies and each buddy has rated a common gaming application, the recommendation component may calculate the average rating of the one or more gaming applications and recommend the gaming application with the highest rating to the user. Those of skill in the art recognize other methods for generating a recommendation based upon one or more buddy ratings.

According to the embodiment illustrated in FIG. 9, if none of a user's one or more buddies has rated at least N items of content associated with the item of content sought by the given user, a recommendation component may generate a recommendation based upon characteristics of the user as indicated in the user's profile, step 960. For example, a user's profile may indicate that the user is twenty-three years old, lives in Arizona, attends Arizona State University and plays football. Therefore, a recommendation component may generate a recommendation for television channels broadcasting football games played by colleges located within Arizona.

The recommendation component may instruct a TV application component to retrieve and deliver one or more items of content stored in a content data store associated with Arizona football games to the user's client device. Those of skill in the art recognize the plurality of content that may be retrieved based upon one or more user characteristics as identified in a user profile. Alternatively, or in conjunction with the foregoing, the recommendation component may provide the user with a recommendation based upon the popularity of one or more items of content. For example, the recommendation component may identify items of television content, audio content, gaming applications, etc., that are most often viewed, accessed, downloaded, etc., and notify the user of such items. The recommendation component may instruct the TV application component to retrieve and deliver one or more items of content stored in a content data store that are identified as being the most frequently selected, downloaded, accessed, etc.

The system of the present invention may also be used to alert a user of one or more events according to user characteristics and preferences identified in a user profile. A user may be interested in various events, warnings, announcements, etc. Current methods for delivering such information to a user may require a user to view a news broadcast, access a particular website, search for content, etc. In order to overcome shortcomings associated with current methods for delivering user specific information, the present invention provides systems and methods that facilitate the retrieval and delivery of various alerts based upon on or more user preferences.

Figure 10:
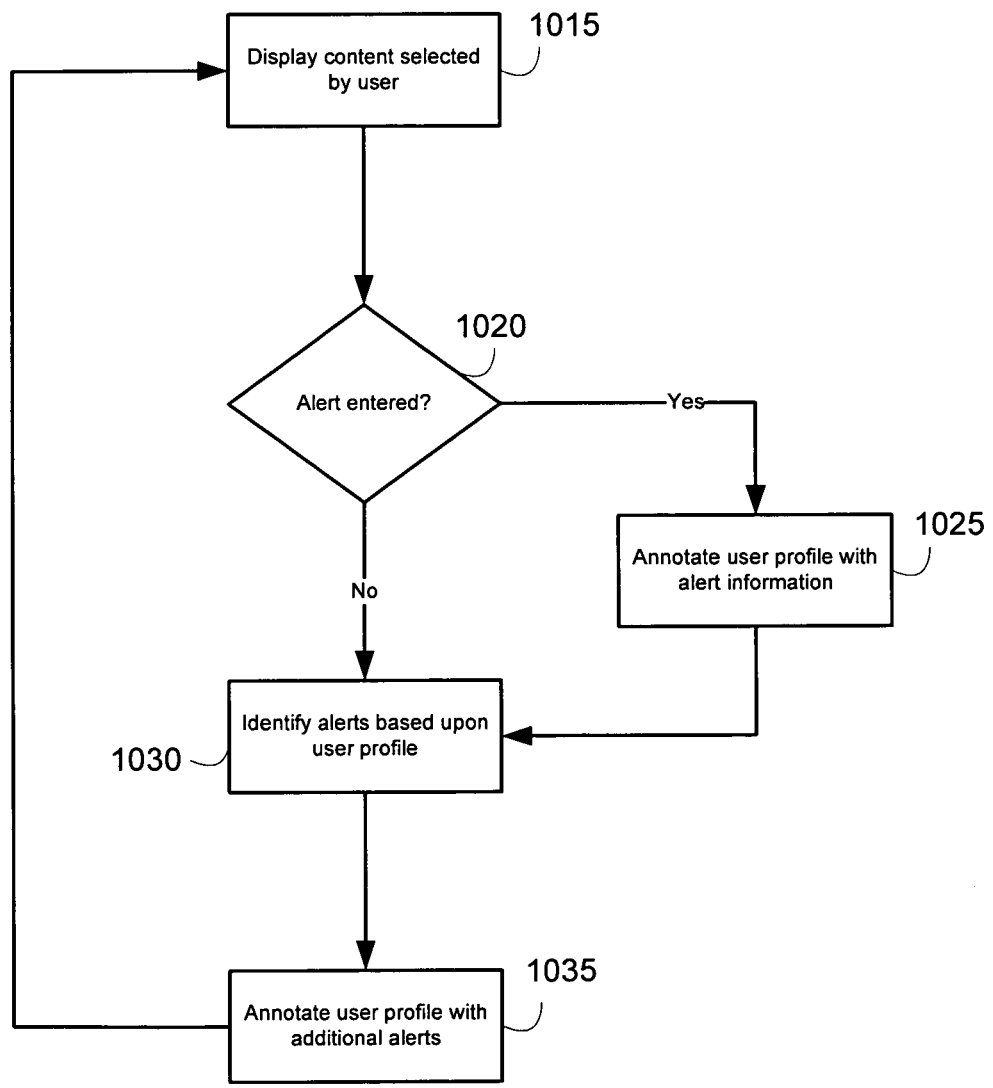
FIG. 10 is a flow diagram presenting a method for generating alerts to provide a user with notification of one or more events according to one embodiment of the present invention.

FIG. 10 is a flow diagram illustrating one embodiment of a method for identifying one or more user alerts. One or more items of content are displayed on the user's client device, step 1015, which may include television content. While logged into the content distribution system, a user may wish to enter one or more alerts to generate a notification of events that are of interest to the given user. For example, a user may wish to receive notification when a movie starring the actor Harrison Ford is broadcast. Similarly, a user who frequently travels may wish to receive notification of traffic reports for one or more highways. Further, a user may wish to receive notification about news events that are of interest to the user. Those of skill in the art recognize other information or events exist for which a given user may wish to receive one or more alerts.

A check is performed to determine whether a given user has entered one or more alerts, step 1020. According to one embodiment of the invention, a user may enter one or more alerts using a graphical user interface that may be accessed by a user of a client device who is logged in to the system described herein. If a user enters an alert, the user's profile is annotated with information identifying the alert indicated by the user, step 1025. If a user does not enter one or more alerts, the user's profile may be used to generate one or more alerts, step 1030. Additionally, a user's profile may also be used to supplement the one or more alerts entered by the user, step 1030. For example, a user's profile may indicate the user is ninety-five years old, lives in Miami, Fla. and enjoys viewing television shows associated with animals. A recommendation component may annotate a user's profile with one or more alerts based upon the user's preferences as identified in the user's profile. Thus, the abovementioned user's profile may be annotated with one or more alerts to provide the user with a notification of television shows that display animals, discounts offered to senior citizens in the Miami, Fla. area, etc.

A recommendation component may further annotate the user's profile with alerts based upon a user's one or more recommendations as identified in the user's profile. For example, a user's profile may indicate that a user enjoyed viewing several movies with the actor Al Pacino. Thus, the user's profile may be annotated with one or more alerts to notify the user when one or more items of content with the actor Al Pacino are available to the user. Those of skill in the art recognize other alerts that may be generated based upon information maintained in a user's profile.

Figure 11:
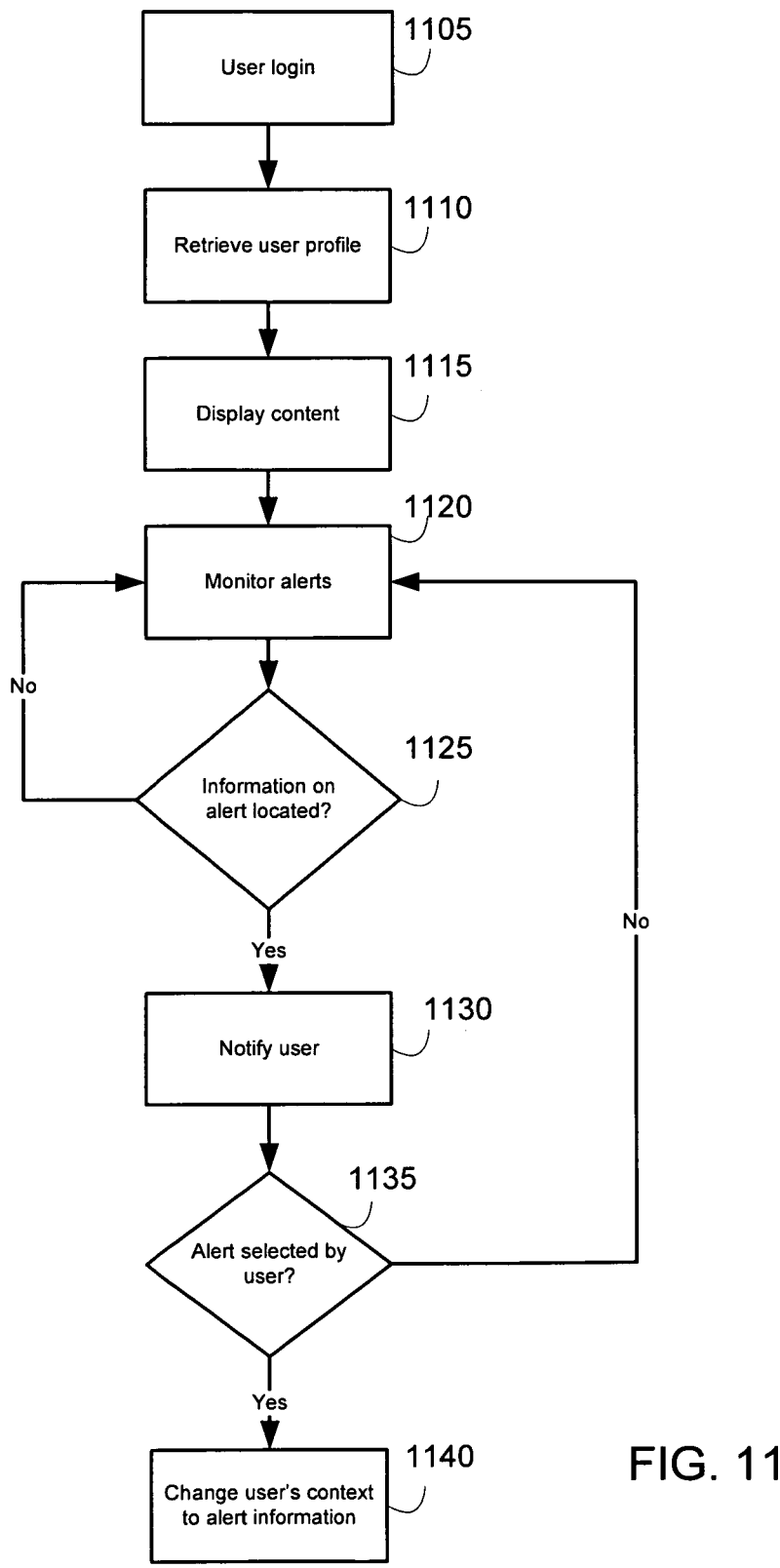
FIG. 11 is a flow diagram presenting a method for delivering a notification to a client device based upon one or more alerts according to one embodiment of the present invention.

FIG. 11 is a flow diagram illustrating one embodiment of a method for delivering an alert to a user based upon information maintained in a user profile. A TV application component may retrieve one or more items of content from a content data store to deliver to a user's client device, step 1115, and the user's profile may be utilized to monitor the one or more alerts identified by the user or generated by a recommendation component, step 1120. According to one embodiment of the invention, a messaging component is operative to monitor the one or more alerts associated with a given user's profile. The messaging component may periodically inspect one or more content data stores to identify information pertaining to a user's one or more alerts, step 1125. If information associated with a user's one or more alerts is identified, the messaging component may instruct a TV application component to deliver a message or other notification to the user's client device, step 1130.

A user presented with an alert may select the alert in order to retrieve additional information on the alert or to change the user's context to display information associated with the alert, step 1135. For example, if a given alert notifies a user of a major traffic accident, the user may select the alert, which may change the user's context to a news broadcast detailing the events of the traffic accident. Similarly, if a given alert notifies a user of a movie that the user may enjoy, the user may select the alert to change the context to tune to the given movie. If information for a given alert is not located, or if a user does not select the alert displayed on the user's client device, the user's context is unchanged, and the one or more alerts identified in the user's profile continue to be monitored, step 1120.

Figure 12:
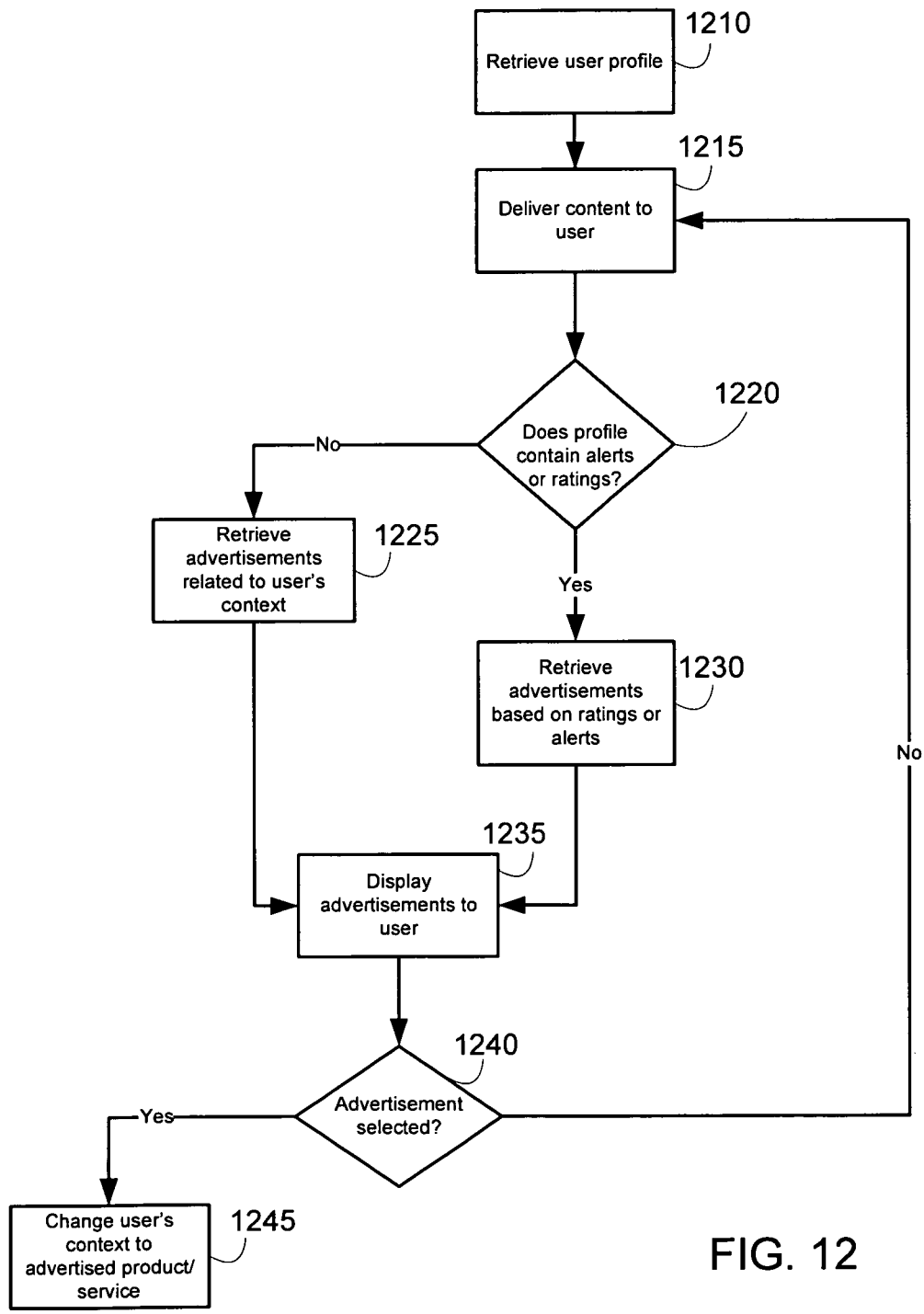
FIG. 12 is a flow diagram presenting a method for delivering personalized advertisements to a client device according to one embodiment of the present invention.

A user's one or more alerts and ratings may further be used to customize the delivery of one or more advertisements to the user's client device. FIG. 12 is a flow diagram illustrating one embodiment of a method for delivering advertisements to a user, which may be based upon the user's one or more alerts and ratings. The user's profile is retrieved, step 1210, and content is delivered to the user's client device, step 1215. A check is performed to determine whether the user's profile contains one or more ratings or one or more alerts, step 1220. If the user's profile contains one or more ratings or one or more alerts, advertisements related to the one or more ratings or one or more alerts may be retrieved, 1230. For example, a content data store may store a plurality of advertisements for various products and services. A given user's profile may indicate that the user lives in Memphis, Tenn., enjoys classical music, is a soccer fan, etc. A recommendation component may instruct a TV application component or another application component to retrieve one or more advertisement related to classical music, soccer, etc., and deliver the advertisements to a user's client device. Similarly, a user's profile may indicate that the user wishes to receive weather related alerts. A recommendation component may instruct the TV application component or other application component to retrieve advertisements for weather related products and services and deliver such advertisement to the user's client device, step 1235.

If a user's profile does not have one or more ratings or alerts, the user's current context may be retrieved by a messaging component and used to determine one or more advertisements to deliver to the user's client device, step 1225. For example, a given user may be viewing the movie "The Shawshank Redemption." The messaging component may retrieve the user's context, and based upon the context retrieved, instruct a TV application component to deliver one or more advertisement related to the user's context. The TV application may retrieve advertisements, such as the soundtrack to the movie "The Shawshank Redemption," and deliver such advertisements to the user's client device, step 1235.

A user may select one or more of the advertisements displayed on the user's client device, step 1240. If a user selects a given advertisement, the user's context may be changed to display additional information on the product or service advertised, step 1245. If a user does not select one or more of the advertisements displayed, the user context is unchanged, step 1215.

Figure 13:
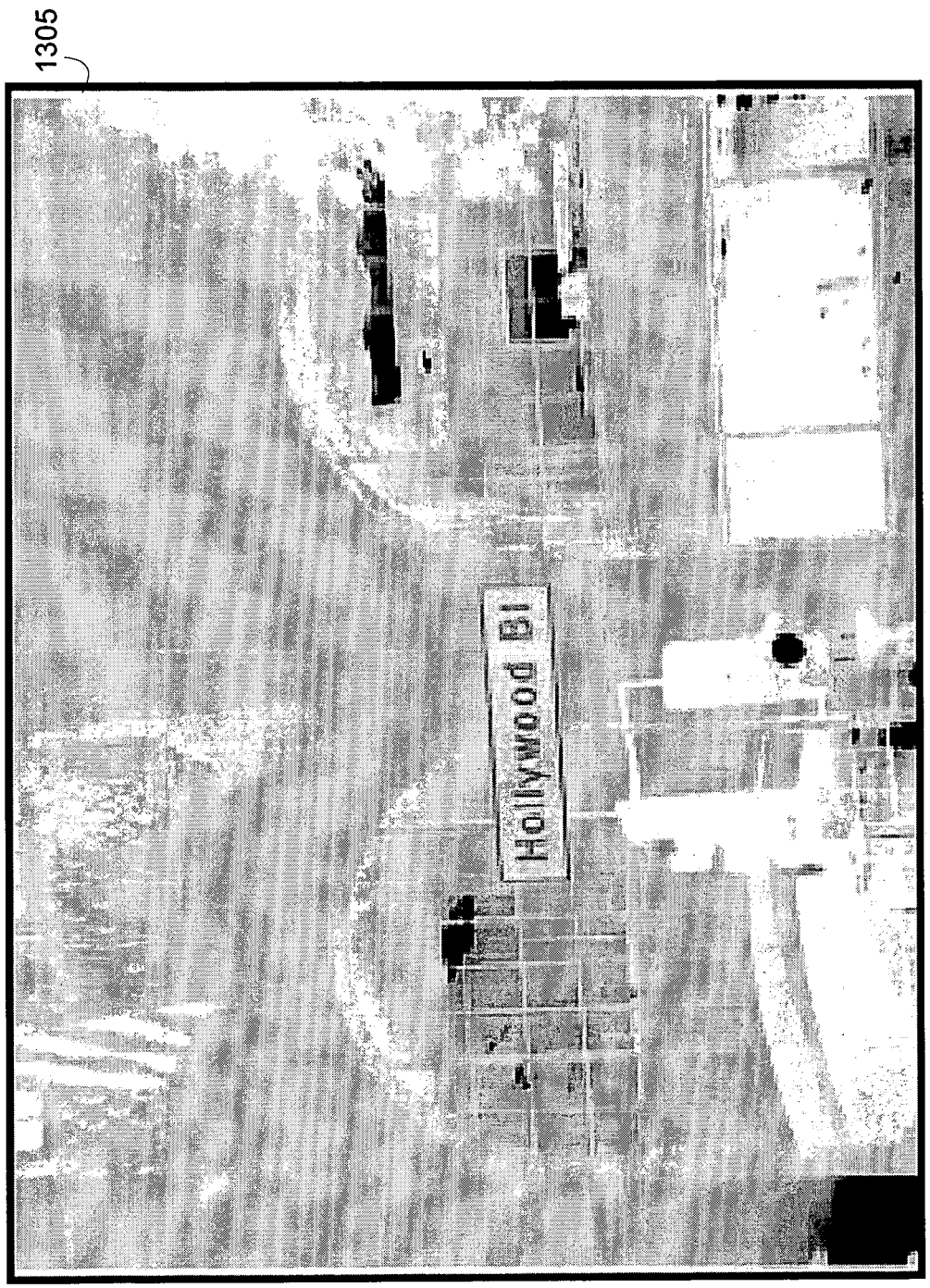
FIG. 13 is a screen diagram illustrating content that may be retrieved and delivered to a given client device according to one embodiment of the present invention.

FIG. 13 is a screen diagram illustrating content that may be delivered to a client device. A user of the system described herein may logon using a logon component that may verify the user's credentials as stored in a user profile. Once logged in, a user may select from among a plurality of content available to the user that may be delivered to a user's client device. As illustrated in FIG. 13, the content 1305 delivered to a client device may comprise television content that is available to a given user. According to one embodiment of the invention, content 1305 that is available to a user is identified based upon a user's location as indicated in the user's profile. For example, an electronic program guide component may query an electronic program guide data store to identify one or more electronic program guides available to a given user based upon the user's location as indicated in the user's profile. The one or more electronic program guides identified by the electronic program guide component may be displayed to the user on the user's client device. The user may select an item in the electronic program guide, which may result in a TV application component retrieving and delivering content 1305 to the user's client device.

While FIG. 13 illustrates the retrieval and delivery of television content 1305 to a user's client device, other content may be retrieved and delivered to a given user's client device. According to one embodiment of the invention, a user may select one or more additional applications from another application component that may store other applications, such as gaming applications, instant messaging applications, etc. The content 1305 selected and displayed on a given user's client device may be modified based upon the type of destination client device. For example, content selected for delivery to a cellular phone device may be sized according to the size of the display of the cellular phone device.

Figure 14:
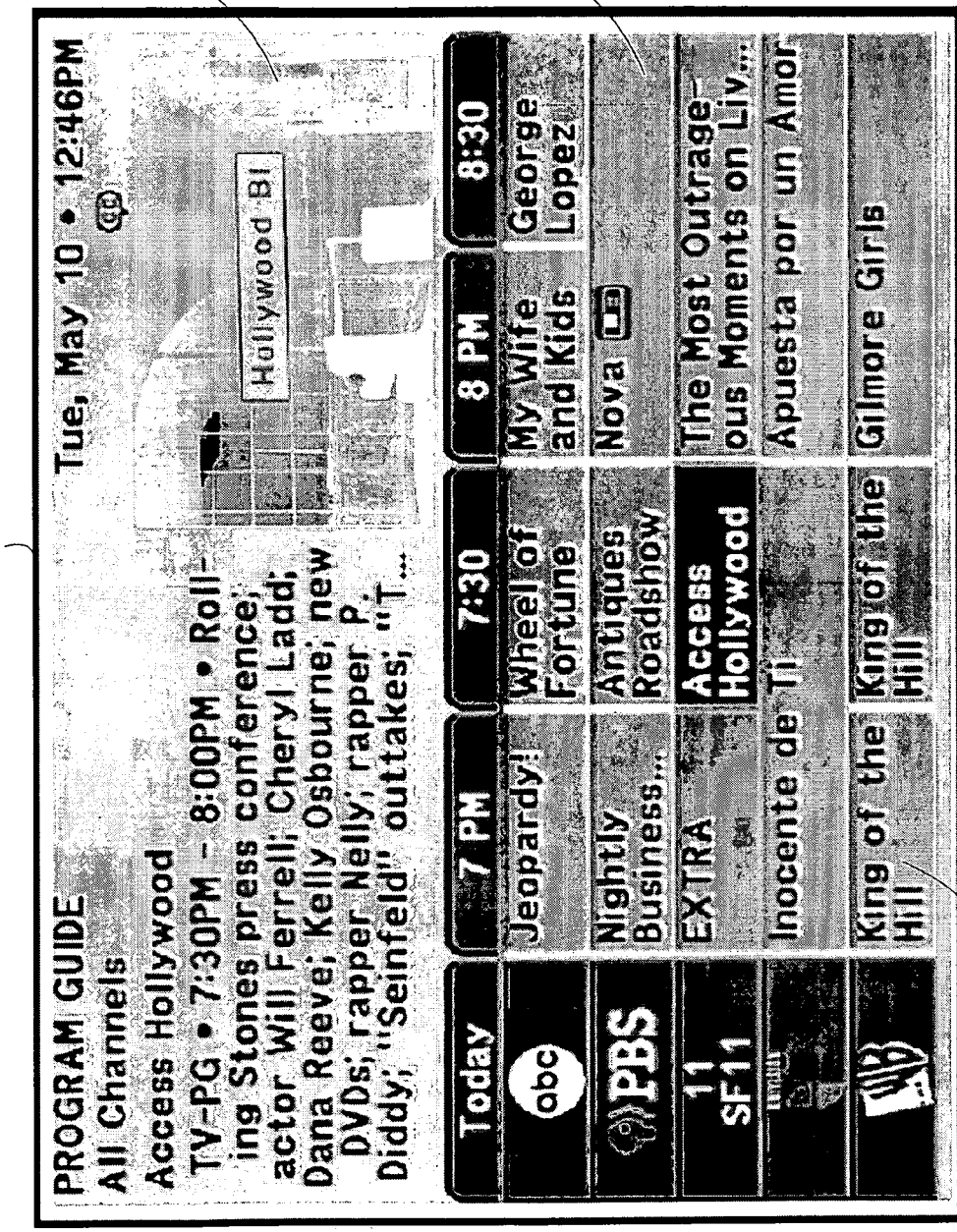
FIG. 14 is a screen diagram illustrating the one or more items of television content available to a client device according to one embodiment of the present invention.

FIG. 14 is a screen diagram illustrating an electronic program guide that may be used by a given user of a client device to select one or more items of television content. As illustrated in FIG. 14, the content 1405 selected and displayed in FIG. 13 is minimized to allow a user to continue view the television content 1405 selected while browsing the plurality of content 1415 and 1410 available to the given user.

The electronic program guide 1400 displayed to a user of a client device may be retrieved by an electronic program guide component that may identify the one or more electronic program guides available to a given user. According to one embodiment of the invention, the content available 1415 and 1410 to a given user is identified based upon a user's location as identified in the user's profile. For example, an electronic program guide displayed to a user in San Francisco, Calif. may correspond to Pacific Standard Time, whereas an electronic program guide displayed to a user in New York City may correspond to Eastern Standard Time. According to another embodiment of the invention, the content available 1415 and 1410 to a given user may be identified based upon a user's preferences as identified in a user profile. For example, a user may subscribe to one or more paid movie services, offering the user additional content. An electronic program guide component may retrieve an electronic program guide 1400 corresponding to a user's subscription service. Those of skill in the art recognize other methods for retrieving and displaying an electronic program guide to a user of a client device.

A user may traverse the plurality of content 1415 and 1410 displayed in the electronic program guide 1400 using a selection device such a remote control and select one or more of the content items 1415 and 1410 available to the user. If a user selects a given item of content 1415 and 1410, the content may be retrieved by a TV application component and displayed on the given user's client device. As illustrated in FIG. 14, the content selected may be modified in order to properly display the content in conjunction with the electronic program guide available to the given user.

Figure 15:
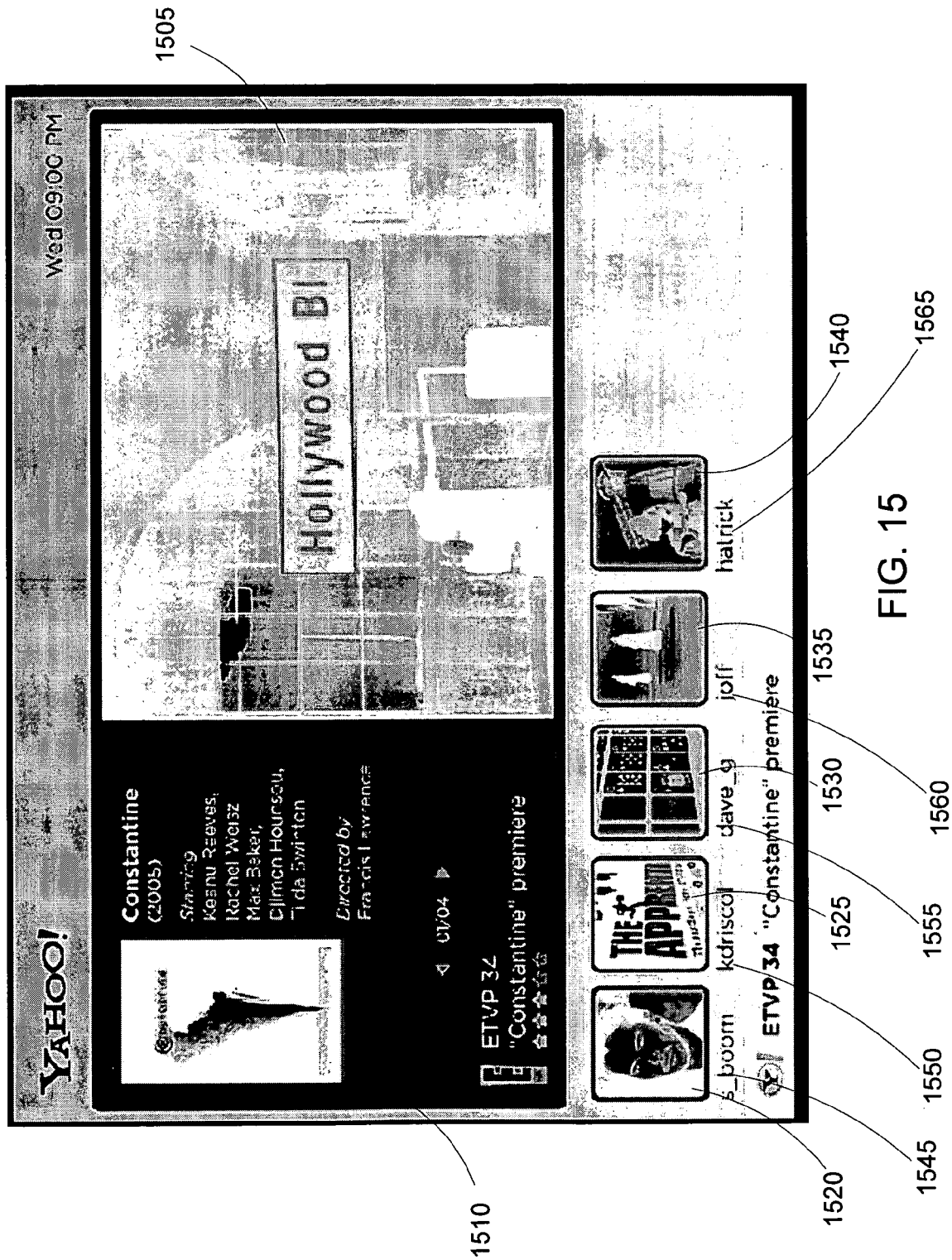
FIG. 15 is a screen diagram illustrating a given user's context displayed in conjunction with a given user's one or more buddies' contexts and one or more advertisements according to one embodiment of the present invention.

In addition to selecting content displayed in an electronic program guide, a user may also select content associated with the user's one or more buddies as illustrated in FIG. 15. According to one embodiment of the invention, a user profile may be used to identify one or more buddies 1545, 1550, 1555, 1560 and 1565 designated by the user in one or more instant messaging applications. Similarly, a user profile may identify buddies that maintain profiles on the content distribution system.

A messaging component may be used to identify the one or more buddies identified in a given user's profile and retrieve the context associated with each buddy 1545, 1550, 1555, 1560 and 1565 who may be active. For example, an active buddy may comprise a buddy who has logged in and maintains a profile on the system described herein. A messaging component may instruct a TV application component to deliver the context associated with a given buddy 1545, 1550, 1555, 1560 and 1565 to a given user. For example, a TV application component may deliver content, such as a television show, to a given buddy's client device. When a user logs on to the system described herein, a user may request to view the content being viewed by the one or more buddies identified in the user's profile. A messaging component may identify the one or more buddies and each respective buddy's 1545, 1550, 1555, 1560 and 1565 context and instruct a TV application component to propagate the one or more buddies' contexts to the given user.

According to the embodiment illustrated in FIG. 15, a TV application component generates a thumbnail 1520, 1525, 1530, 1535 and 1540 image representing the context of a given buddy 1545, 1550, 1555, 1560 and 1565, which the TV application component propagates to the given user's client device. The thumbnail 1520, 1525, 1530, 1535 and 1540 may be annotated with information describing the particular context, e.g., title, channel, rating, etc. The context of a user's one or more buddies 1545, 1550, 1555, 1560 and 1565 may also be displayed in conjunction with the content 1505 being viewed by the given user. The display area of a given user's client device may be modified to accommodate for the user's one or more buddies 1545, 1550, 1555, 1560 and 1565 and the content 1505 being viewed by the user.

According to another embodiment of the invention, a TV application component delivers the actual content being viewed by a given buddy 1545, 1550, 1555, 1560 and 1565. For example, a buddy 1545, 1550, 1555, 1560 and 1565 associated with a given viewer may be viewing the show "The Apprentice." As described above, one method of indicating the buddy's 1545, 1550, 1555, 1560 and 1565 context is delivering a thumbnail image 1520, 1525, 1530, 1535 and 1540 associated with the buddy's 1545, 1550, 1555, 1560 and 1565 context to the user's client device. Additionally, the TV application may deliver streaming content to the user's client device, allowing the user to view the content of a given buddy 1545, 1550, 1555, 1560 and 1565 in conjunction with the content 1505 being viewed by the given user. While the screen diagram illustrated in FIG. 15 provides the context of five buddies 1545, 1550, 1555, 1560 and 1565, additional or fewer buddies may be displayed to a given user based upon a threshold or the number of buddies identified in a user's profile.

Advertisements or other ancillary content may also be displayed in conjunction with content and the context of a user's one or more buddies. As illustrated in FIG. 15, an advertisement 1510 is display that corresponds to the current content 1505 being displayed on the user's client device. The advertisement 1510 displayed may be selected, thereby allowing a user to acquire further information for the product or service advertised, 1510. The one or more advertisements 1510 displayed in conjunction with content 1505 and a user's one or more buddies 1545, 1550, 1555, 1560 and 1565 may be selected according to a user's ratings or alerts, as described herein. Similarly, the one or more advertisements 1510 displayed on a user's client device may be selected based upon the content 1505 selected and delivered to the user's client device. For example, the advertisement 1510 displayed is an advertisement for a movie associated with the content 1505 displayed.

Figure 16:
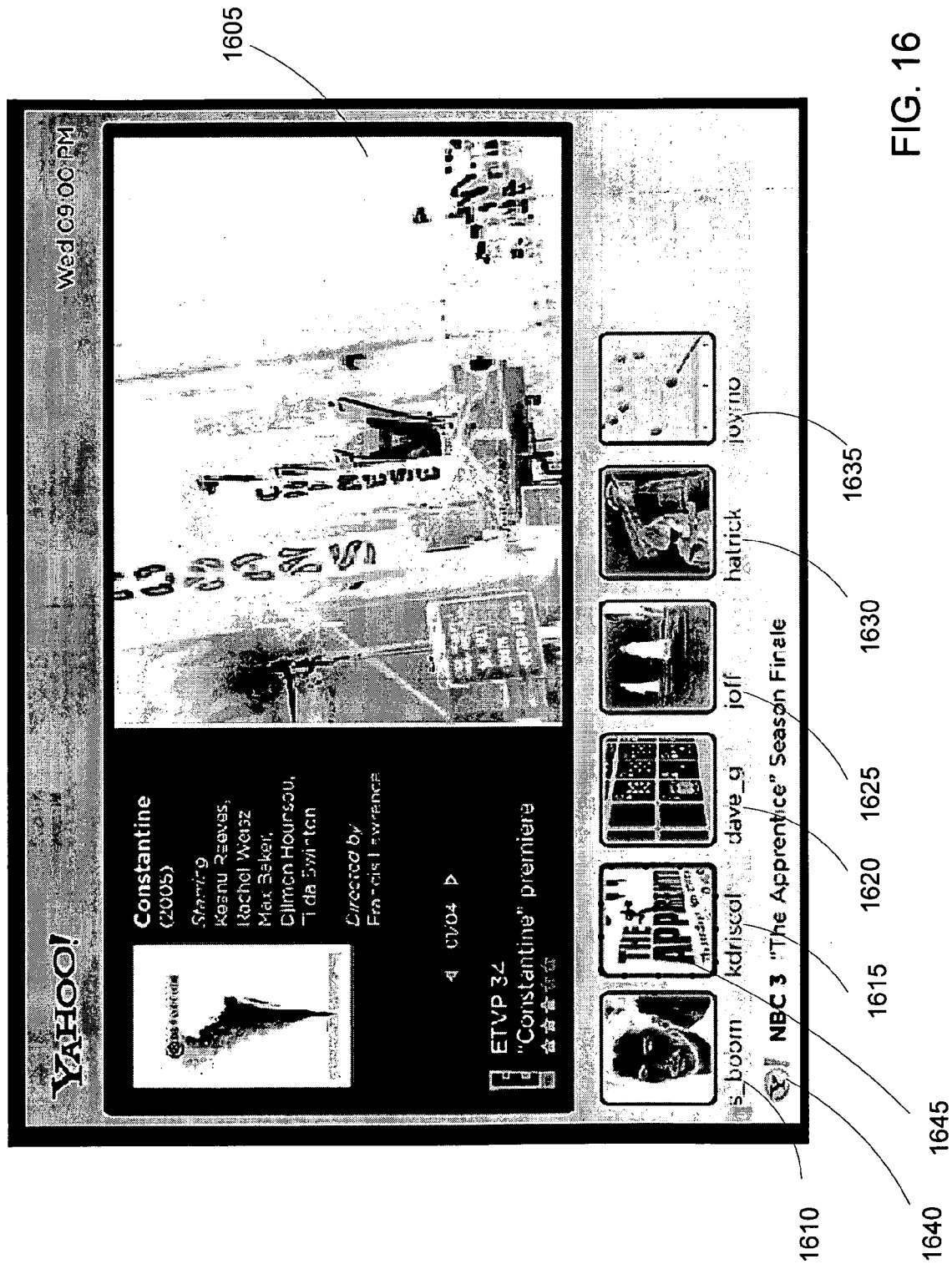
FIG. 16 is a screen diagram illustrating the traversal of one or more contexts associated with a user's one or more buddies according to one embodiment of the present invention.

FIG. 16 is a screen diagram illustrating the plurality of buddies 1610, 1615, 1620, 1625, 1630 and 1635 associated with a user and a visual representation of each buddy's respective context. A user's one or more buddies, as identified in the user's profile, may view television content, participate in an online gaming application, watch a movie, etc. A visual representation of each buddy's respective context may be propagated to a user's client device via a TV application component in conjunction with television content selected by a given user.

Using a selection device, such as a remote control, keyboard, mouse, etc., a user may traverse the visual representation of the one or more buddies' 1610, 1615, 1620, 1625, 1630 and 1635 contexts displayed on the user's client device. As illustrated in FIG. 11, as a user traverses the visual representations of the one or more buddies' 1610, 1615, 1620, 1625, 1630 and 1635 contexts displayed, a particular visual representation of a buddy's 1615 context may be highlighted 1645 or otherwise marked. Information 1640 may be displayed to the user further identifying the context of the highlighted buddy, such as program, title, channel, network, rating, etc. As a user traverses the context associated with the user's one or more buddies 1610, 1615, 1620, 1625, 1630 and 1635, a user may continue to view and select content 1605. For example, a user may simultaneously view the context of the user's one or more buddies 1610, 1615, 1620, 1625, 1630 and 1635 while changing television channels, engaging in an online gaming application, watching a movie, etc.

According to one embodiment of the invention, the display of a user's one or more buddies 1610, 1615, 1620, 1625, 1630 and 1635 and associated contexts may be turned on or off. For example, a user viewing a movie may wish to have the movie occupy the entire display area of the user's client device. The user may thus deactivate the display of the user's buddies 1610, 1615, 1620, 1625, 1630 and 1635 and associated contexts. Similarly, a user may limit the number of buddies 1610, 1615, 1620, 1625, 1630 and 1635 and associated contexts displayed on the user's client device. For example, a user's profile may identify twenty buddies who may all be active while the user is engaging in an online gaming application. The user may wish to limit the number of buddies 1610, 1615, 1620, 1625, 1630 and 1635 and associated contexts displayed in order to minimize clutter on the screen, maximize the display of the gaming application, etc. According to another embodiment of the invention, a user may modify the location of the display of buddies 1610, 1615, 1620, 1625, 1630 and 1635 and associated contexts in the display area of the user's client device. While the screen diagram illustrated in FIG. 16 shows a row of buddies 1610, 1615, 1620, 1625, 1630 and 1635 with associated contexts on the bottom of the display area, one or more of the buddies 1610, 1615, 1620, 1625, 1630 and 1635 and associated contexts may be placed in positions that accommodate a user's needs or preferences.

Figure 17:
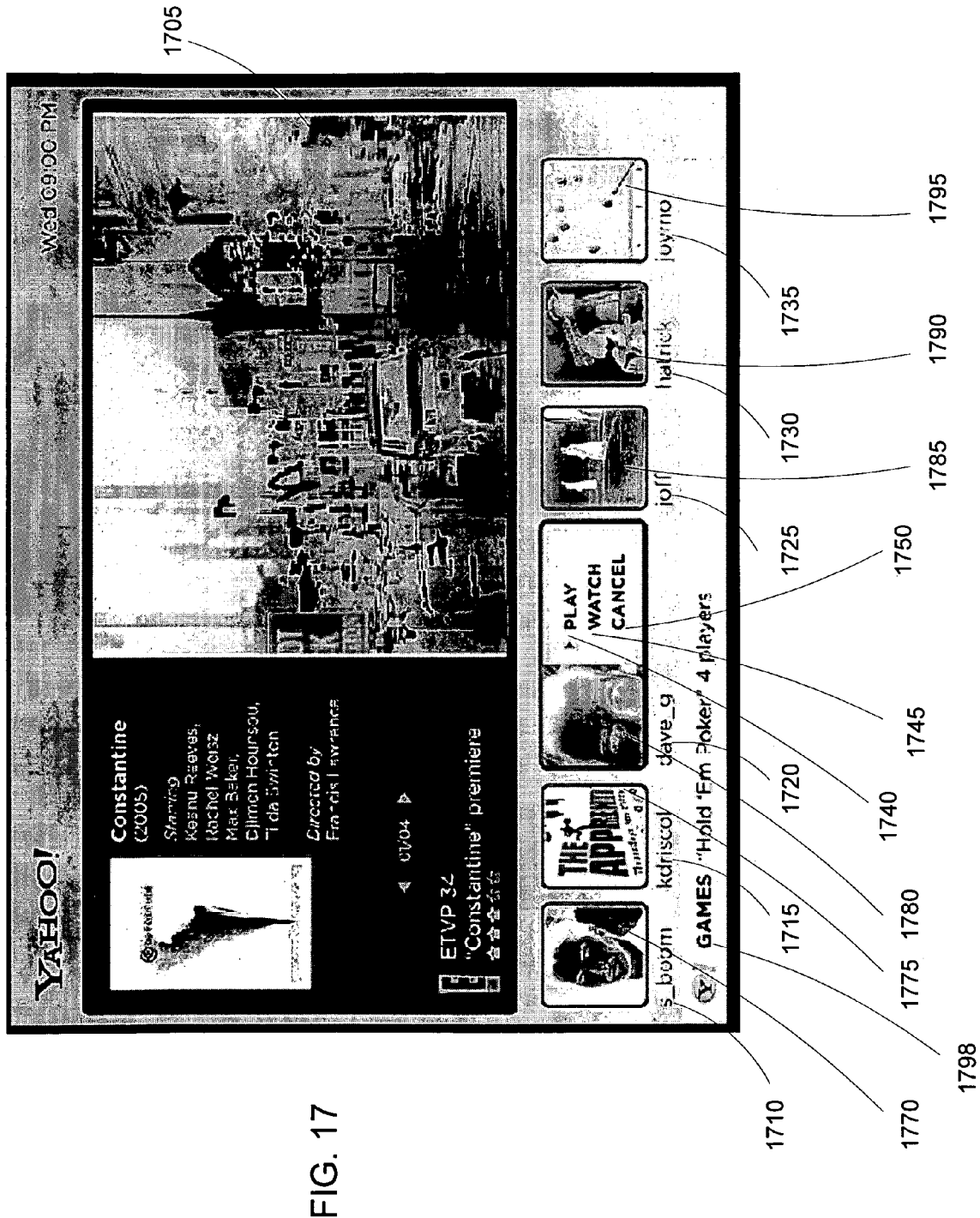
FIG. 17 is a screen diagram illustrating the one or more options available upon selection of a given buddy's context according to one embodiment of the present invention.

FIG. 17 is a screen diagram illustrating another embodiment of the plurality of buddies 1710, 1715, 1720, 1725, 1730 and 1735 associated with a user and each buddy's respective context 1770, 1775, 1780, 1785, 1790 and 1795 that may be selected by the user. The context 1770, 1775, 1780, 1785, 1790 and 1795 of a user's one or more buddies 1710, 1715, 1720, 1725, 1730 and 1735, as identified in the user's profile, may be propagated to a user's client device via a TV application component. A user's one or more buddies 1710, 1715, 1720, 1725, 1730 and 1735 may be viewing television content, engaging in an online gaming application, etc. The context 1770, 1775, 1780, 1785, 1790 and 1795 of each buddy 1710, 1715, 1720, 1725, 1730 and 1735 may be viewed on the user's client device in conjunction with the one or more items of content 1705 selected by the user.

As previously described, using a selection device, a user may traverse the contexts 1770, 1775, 1780, 1785, 1790 and 1795 associated with the user's one or more buddies 1710, 1715, 1720, 1725, 1730 and 1735. When a given context 1780 associated with a buddy 1720 is highlighted or otherwise marked, additional information 1798 associated with the buddy's 1720 context 1780, such as channel, title, network, etc., is displayed to the user. Additionally, if a user selects a context 1780 associated with a given buddy, a user may be presented with one or more options 1740, 1745 and 1750. For example, the screen diagram illustrated in FIG. 17 presents a user selecting a buddy's context 1780, which is an online poker gaming application. When the user selects the context 1780 associated with the buddy 1720 participating in the online poker gaming application, the user is presented with a plurality of options. The "watch" 1745 option allows the user to view the poker game that the buddy is participating in. For example, by selecting "watch," 1745 the buddy's context 1780, namely the online poker gaming application, may be propagated to the user's client device. The user may continue to view the television content 1705 along with the buddy's online poker game. Selecting "cancel" 1750 may allow the user to continue traversing the one or more contexts 1770, 1775, 1780, 1785, 1790 and 1795 associated with the users one or more buddies 1710, 1715, 1720, 1725, 1730 and 1735.

Figure 18:
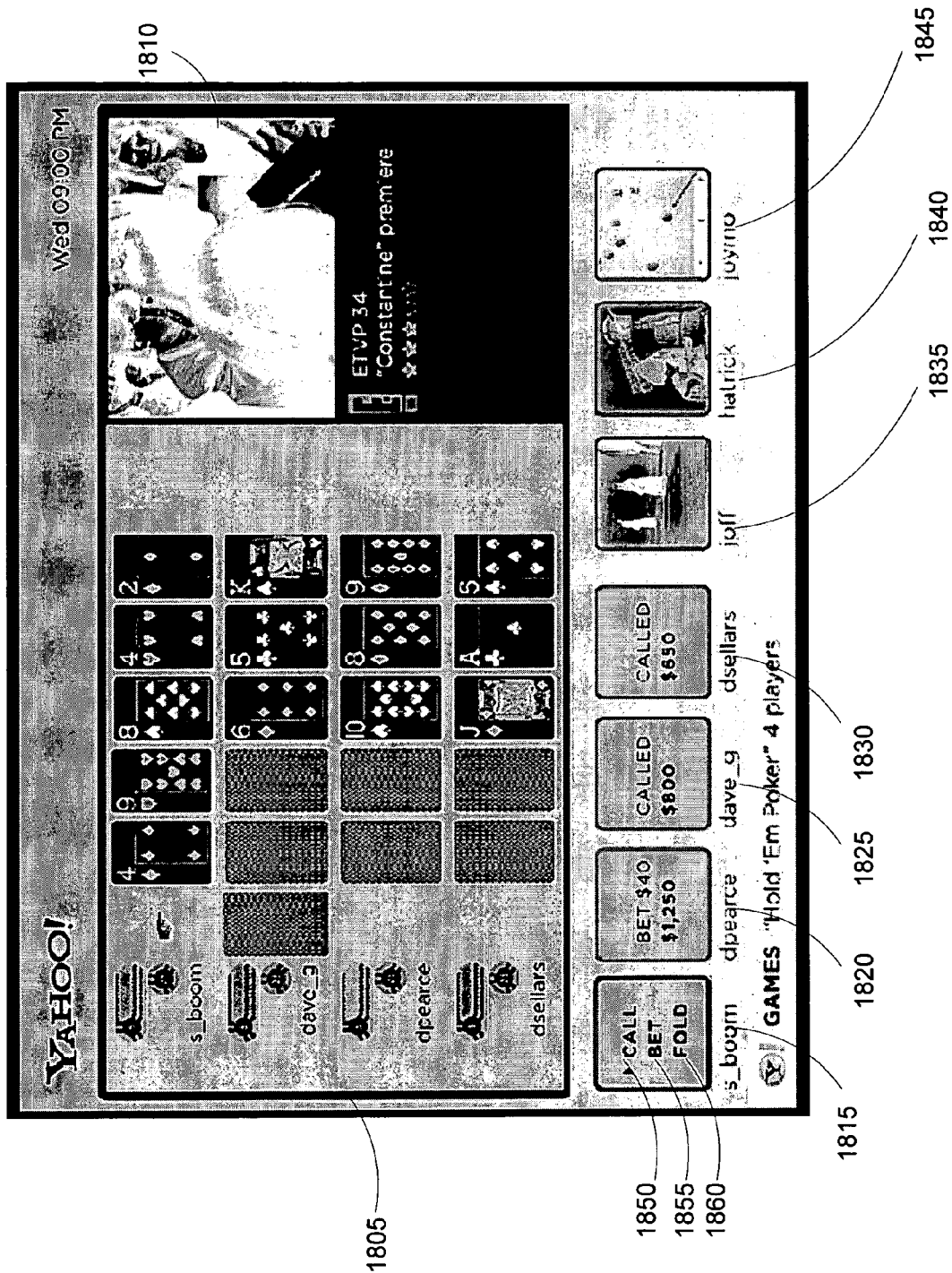
FIG. 18 is a screen diagram illustrating the selection and propagation of a given buddy's context to a user's client device according to one embodiment of the present invention.

By selecting "play," 1740 a user may elect to participate in the buddy's 1720 online poker gaming application. For example, if the user selects "Play," 1740 the context 1780 of the buddy 1720 is propagated to the user's client device. Moreover, the user's profile may be used to identify the user as a participant and engage the user in the poker game. FIG. 18 presents a screen diagram illustrating the content associated with the context change that may be displayed to a user upon selecting the "play" 1740 option associated with a given buddy's 1720 gaming context 1780.

According to the embodiment illustrated in FIG. 18, a user may engage in the gaming application associated with one or more selected buddies. The context of the selected buddy is delivered to the user's client device, allowing the user to participate in the gaming application. A user may continue to the view the content 1810 previously selected while taking part in the gaming application.

As illustrated in FIG. 18, a user's buddies 1815, 1820, 1825, 1830, 1835, 1840 and 1845 may be modified to reflect the user's context change. More specifically, the user's context, previously comprised only of television content, now comprises both television content 1810 and a poker gaming application 1805. Therefore, the buddies displayed to a user may be modified to reflect the buddies associated with the changed context. The buddies "joff," 1835 "hatrick" 1840 and "joymo," 1845 associated with the user's television viewing 1810 continue to be displayed on the user's client device as the user continues to view television content 1810, whereas the buddies 1815, 1820, 1825 and 1830 associated with the user's gaming application 1805 are retrieved and displayed on the user's client device. The user is further presented with a plurality of controls 1850, 1855 and 1860 for participating in the gaming application 1805.

Figure 19:
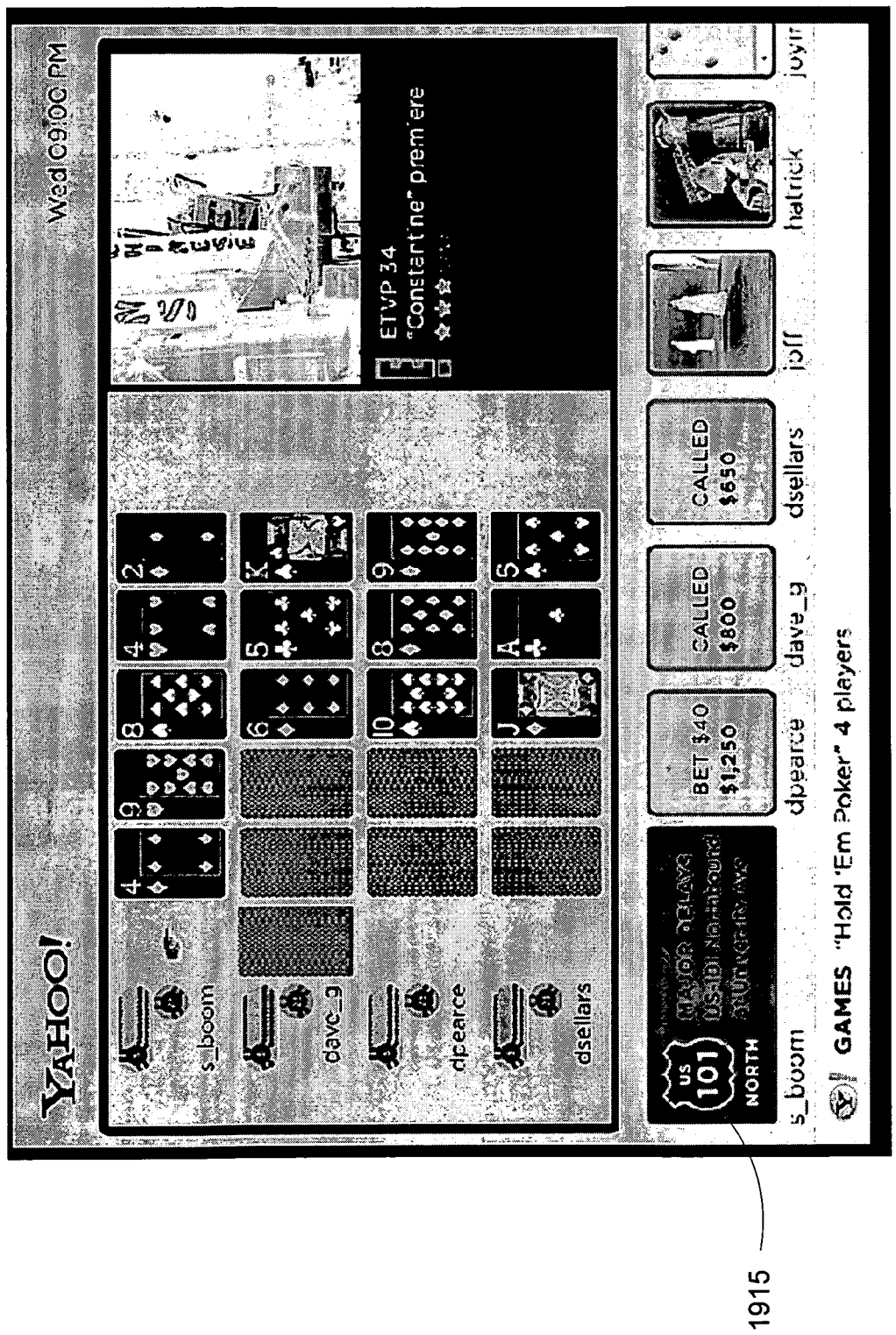
FIG. 19 is a screen diagram illustrating the delivery of an alert to a client device based upon one or more alerts identified in a user profile according to one embodiment of the present invention.

As illustrated in FIG. 19, a user may receive one or more alerts while viewing content or participating in a gaming application. According to methods described herein, a user's profile may identify one or more alerts, wherein alerts may comprise events or notifications that the user wishes to receive or that may be of interest to a given user. A traffic alert 1915 is illustrated, notifying the user of "Major Delays" on a roadway that may be relevant to the user. While the alert presented is a traffic related alert 1915, other alerts may be displayed on a user's client device based upon the one or more alerts identified in a user's profile or the user's particular context. For example, a user participating in an online poker game may receive an alert notifying the user that a given casino is conducting a poker tournament. Similarly, a user's profile may indicate that the user wishes to receive an alert notifying the user when the television show "The Real World" will be broadcast. Those of skill in the art recognize other alerts that may be displayed to a user of a client device based upon a user's profile or a user's particular context.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A method comprising:
   receiving, by a content distribution server, a request to facilitate web remote access to a given user's set-top device from a remote access device;
   retrieving, by the server, a profile of the given user, the profile including identification of the given user's set-top device;
   identifying to the remote access device, by the server, content available from a local electronic program guide associated with the set-top device, the set-top device operative to receive content including television content, audio content, and gaming applications;
   receiving, by the server from the remote access device, via the web remote access to the set-top device, one or more user-specified tags associated with the content available from the local electronic program guide associated with the set-top device, the tags including one or more identifiers identifying at least one portion of a content item specified by the given user;
   identifying, by the server, one or more buddies of the user as indicated in the profile, the identifying of the one or more buddies comprises:
      identifying characteristics of the given user based on the profile;
      examining characteristics of other user profiles to identify one or more other users with similar characteristics; and
      identifying the one or more other users as the one or more buddies;
   providing, by the server, a list of the one or more buddies, said list comprising information identifying the one or more buddies and a context associated with each of the one or more buddies, the context capable of indicating each of the one or more buddies watching television content, listening to audio content and executing a gaming application;
   receiving, by the server, a selection of the one or more buddies from the remote access device;
   determining, by the server, the one or more selected buddies are active buddies on one or more third party instant messaging applications; and
   delivering, by the server, the one or more user-specified tags from the content distribution server to the one or more selected buddies on the one or more third party instant messaging applications, the user-specified tags providing the buddies with direct access to the content item to view streaming content including the at least one portion of content item identified by the one or more identifiers.

2. The method of claim 1, wherein the available content further includes at least one of television content, audio content, video content, web pages, and gaming applications.

3. The method of claim 1, wherein the content item comprises content recommended based on the profile.

4. The method of claim 1, wherein the content item comprises content selected by the given user.

5. The method of claim 1, wherein the identifying the one or more buddies comprises:
   identifying one or more instant messaging applications to which the user has subscribed;
   identifying one or more other users in the one or more instant messaging applications; and
   identifying at least one of the one or more of the other users as the one or more buddies.

6. The method of claim 1, wherein the one or more user-specified tags comprises user-specified delimiters of the at least one portion of the content item.

7. The method of claim 6, wherein the delivering the one or more tags to the one or more buddies comprises delivering the delimiters to the one or more buddies.

8. The method of claim 1 wherein the remote access device directly communicates with the content distribution server via a network without going through the set-top box.

9. A system comprising:
   a content store for storing one or more content items;
   a set-top device of a given user, the set-top device operative to receive the content items including television content, audio content, and gaming applications;
   a remote access device of the given user;
   an other user device of another user; and
   a content distribution server coupled to the content store, the given user device and the other user device, the content distribution server operative to:

receive a request from the remote access device to facilitate web remote access to the given user's set-top device;

retrieve a profile of the given user, the profile including identification of the given user's set-top device, provide a local electronic program guide to the set-top device, identify to the remote access device content available from the local electronic program guide associated with the set-top device, receive from the remote access device, via the web remote access to the set-top device, one or more user-specified tags associated with the television content, audio content and gaming applications content available from the local electronic program guide associated with the set-top device, the tags including one or more identifiers identifying at least one portion of a content item specified by the given user, identify one or more buddies of the user as indicated in the profile, providing a list of the one or more buddies, said list comprising information identifying the one or more buddies and a context associated with each of the one or more buddies, the context capable of indicating each of the one or more buddies watching television content, listening to audio content and executing a gaming application, wherein the content distribution server is operative to identify characteristics of the given user from the profile, examine characteristics of other user profiles to identify other users with similar characteristics, and identify the one or more other users as the one or more buddies, receive a selection of the one or more buddies from the remote access device, determine the one or more selected buddies are active buddies on one or more third party instant messaging applications, and deliver the one or more user-specified tags from the content distribution server to the one or more selected buddies on the one or more third party instant messaging applications, the user-specified tags providing the buddies with direct access to the content item to view streaming content including the at least one portion of content identified by the one or more identifiers.

10. The system of claim 9, wherein the available content includes at least one of television content, audio content, video content, web pages, and gaming applications.

11. The system of claim 9, wherein the content item comprises content recommended based on the profile.

12. The system of claim 9, wherein the content item comprises content selected by the given user.

13. The system of claim 9, wherein the content distribution server is operative to identify one or more instant messaging applications to which the user has subscribed, identify one or more other users in the one or more instant messaging applications, and identify at least one of the one or more of the other users as the one or more buddies.

14. The system of claim 9, wherein the one or more user-specified tags comprises user-specified delimiters of the at least one portion of the content item.

15. The system of claim 14, wherein the content distribution server is operative to deliver the delimiters to the one or more buddies.

16. The system of claim 15, wherein the content distribution server is operative to deliver the at least one portion of the content item to the one or more buddies.

17. A system comprising:

first receiving means for receiving a request to facilitate web remote access to a given user's set-top device from a remote access device;

retrieving means for retrieving a profile of the given user, the profile including identification of the given user's set-top device;

first identifying means for identifying to the remote access device content available from a local electronic program guide associated with the set-top device, the set-top device operative to receive content including television content, audio content, and gaming applications;

second receiving means for receiving from the remote access device, via the web remote access to the set-top device, one or more user-specified tags associated with the content available from the local electronic program guide associated with the set-top device, the tags including one or more identifiers identifying at least one portion of a content item specified by the given user;

second identifying means for identifying one or more buddies of the user as indicated in the profile, the second identifying means for identifying the one or more buddies comprises means to identify characteristics of the given user based on the profile, means to examine characteristics of other user profiles to identify one or more other users with similar characteristics, and means to identify the one or more other users as the one or more buddies;

providing means for providing a list of the one or more buddies, said list comprising information identifying each of the one or more buddies and a context associated with the one or more buddies, the content capable of indicating each of the one or more buddies watching television content, listening to audio content and executing a gaming application;

third receiving means for receiving a selection of the one or more buddies from the remote access device;

determining means for determining the one or more selected buddies are active buddies on one or more third party instant messaging applications; and delivering means for delivering the one or more user-specified tags to the one or more selected buddies on the one or more third party instant messaging applications, the user-specified tags providing the buddies with direct access to the content item to view streaming content including the at least one portion of content item identified by the one or more identifiers.

18. The system of claim 17, wherein the retrieving means includes a profile component.

19. The system of claim 17, wherein the second identifying means includes a messaging component.

20. The system of claim 17, wherein the first identifying means, second receiving means, and delivering means each include a portion of a TV application component.

* * * * *